(12) United States Patent
Zecha et al.

(10) Patent No.: US 9,650,507 B2
(45) Date of Patent: May 16, 2017

(54) METHOD FOR PRODUCING VINYL ESTER POLYMERS HAVING SPECIFICALLY SETTABLE DISPERSITY AND LOW POLYDISPERSITY

(71) Applicant: Wacker Chemie AG, Munich (DE)

(72) Inventors: Helmut Zecha, Burghausen (DE); Hans-Peter Weitzel, Reischach (DE)

(73) Assignee: WACKER CHEMIE AG, Munich (DE)

( * ) Notice: Subject to any disclaimer, the term of this patent is extended or adjusted under 35 U.S.C. 154(b) by 95 days.

(21) Appl. No.: 14/390,120

(22) PCT Filed: Apr. 2, 2013

(86) PCT No.: PCT/EP2013/056892
§ 371 (c)(1),
(2) Date: Oct. 2, 2014

(87) PCT Pub. No.: WO2013/150001
PCT Pub. Date: Oct. 10, 2013

(65) Prior Publication Data
US 2015/0057405 A1    Feb. 26, 2015

(30) Foreign Application Priority Data
Apr. 3, 2012    (DE) .................. 10 2012 205 455

(51) Int. Cl.
| | | |
|---|---|---|
| C08F 2/20 | (2006.01) | |
| C08F 2/22 | (2006.01) | |
| C08L 29/04 | (2006.01) | |
| C09D 131/04 | (2006.01) | |
| C09J 131/04 | (2006.01) | |
| C04B 24/26 | (2006.01) | |
| C04B 26/04 | (2006.01) | |
| C04B 103/00 | (2006.01) | |
| C04B 103/40 | (2006.01) | |

(52) U.S. Cl.
CPC .......... *C08L 29/04* (2013.01); *C04B 24/2623* (2013.01); *C04B 26/04* (2013.01); *C08F 2/20* (2013.01); *C08F 2/22* (2013.01); *C09D 131/04* (2013.01); *C09J 131/04* (2013.01); *C04B 2103/0057* (2013.01); *C04B 2103/408* (2013.01); *C08L 2201/50* (2013.01)

(58) Field of Classification Search
CPC .................................... C08F 2/20; C08F 2/22
USPC .................................................. 524/819, 503
See application file for complete search history.

(56) References Cited

U.S. PATENT DOCUMENTS

| 3,061,560 A | 10/1962 | Kuhlkamp |
|---|---|---|
| 3,470,125 A | 9/1969 | Sliwka |
| 4,247,438 A | 1/1981 | Eck |
| 4,408,237 A | 10/1983 | Takahashi |
| 4,456,726 A | 6/1984 | Siol |
| 4,528,315 A | 7/1985 | Eck |
| 5,124,401 A | 6/1992 | Selig |
| 5,679,735 A | 10/1997 | Geissler |
| 5,994,428 A | 11/1999 | Lutz |
| 6,576,698 B1 | 6/2003 | Weitzel |
| 2002/0032268 A1 | 3/2002 | Weitzel |
| 2002/0115785 A1 | 8/2002 | Weitzel |
| 2003/0065079 A1 | 4/2003 | Weitzel |
| 2003/0125451 A1* | 7/2003 | Weitzel ................ C08F 210/02 524/503 |
| 2004/0097645 A1 | 5/2004 | Weitzel |
| 2005/0043463 A1 | 2/2005 | Muller |
| 2006/0074187 A1 | 4/2006 | Stark |
| 2007/0112117 A1 | 5/2007 | Weitzel |
| 2008/0039572 A1 | 2/2008 | Mueller |
| 2012/0009379 A1 | 1/2012 | Muller |

FOREIGN PATENT DOCUMENTS

| DE | 1029565 | 5/1958 |
|---|---|---|
| DE | 1260145 | 2/1968 |
| DE | 1595402 | 3/1970 |
| DE | 2837992 | 3/1980 |
| DE | 3036696 | 4/1981 |
| DE | 3147008 | 6/1983 |
| DE | 3227090 | 1/1984 |
| DE | 19962566 | 7/2001 |
| DE | 10035589 | 2/2002 |
| DE | 102006037317 | 2/2008 |
| DE | 102007021776 | 11/2008 |
| DE | 10337183 | 8/2009 |
| DE | 102009008143 | 8/2010 |
| EP | 0224169 | 6/1987 |
| EP | 0789035 | 8/1997 |
| EP | 0899281 | 3/1999 |
| EP | 1215219 | 6/2002 |
| EP | 1262465 | 12/2002 |
| EP | 1420033 | 5/2004 |
| EP | 1788001 | 5/2007 |
| GB | 857514 | 12/1960 |
| GB | 1117711 | 6/1968 |
| WO | 2004065437 | 8/2004 |

OTHER PUBLICATIONS

Fikentscher, Cellulosechemie 13 (1932) 58 (with English Abstract).

* cited by examiner

*Primary Examiner* — Kelechi Egwim
(74) *Attorney, Agent, or Firm* — RatnerPrestia

(57) ABSTRACT

Methods for producing protective-colloid-stabilized aqueous dispersions of vinyl ester, polymers having weight-average particle diameters Dw of 120 nm to 1,500 nm and a polydispersity PD<1.6 include radically initiated emulsion polymerizations of one or more vinyl esters and optionally one or more additional ethylenically unsaturated monomers in aqueous medium in the presence of one or more protective colloids, wherein an aqueous mixture containing 0 to 90 grams of one more protective colloids per liter of water is provided to the receiver (concentration (C)), and starting with or after the start of the metered addition of one or more initiators, one or more protective colloids and the total amount of vinyl esters used are added in a metered manner, the emulsion polymerizations being performed in the absence of vinyl halogenides.

7 Claims, 3 Drawing Sheets

METHOD FOR PRODUCING VINYL ESTER POLYMERS HAVING SPECIFICALLY SETTABLE DISPERSITY AND LOW POLYDISPERSITY

CROSS REFERENCE TO RELATED APPLICATIONS

This application is the national phase filing of international patent application No. PCT/EP2013/056892, filed 2 Apr. 2013, and claims priority of German application number 10 2012 205 455.3, filed 3 Apr. 2012, the entireties of which applications are incorporated herein by reference.

FIELD OF THE INVENTION

The present invention relates to processes for producing protective colloid-stabilized aqueous dispersions of vinyl ester polymers having particular weight-average particle diameters and low polydispersity, to the process products thus obtained and to uses of the process products, for example as binders.

BACKGROUND OF THE INVENTION

Processes for preparing vinyl ester polymers in the form of aqueous dispersions by free-radically initiated emulsion polymerizations have long been known. Polymer dispersions of this kind find a wide variety of different uses, for example in binders for adhesives, for fiber binding of nonwoven webs, for impregnation or coating of textile fabrics, in aqueous emulsion paints or, after spray drying, as water-redispersible polymer powders, for example as binders in cementitious or non-cementitious applications in the construction industry.

The use properties of aqueous dispersions of vinyl ester polymers are determined and controlled by the polymer composition, by the nature and proportions of auxiliaries, for example protective colloids, emulsifiers and initiators, and to a crucial degree also by the size and size distribution of the vinyl ester polymer particles. The size of the polymer particles influences rheological properties of aqueous dispersions, for example the viscosity thereof, formulability with additives, setting rate, transparency and gloss of a coating film, the water absorption of a binder film, the mechanical strength thereof, for example the wet abrasion resistance thereof.

The size of the polymer particles can be quantified by the weight-average particle diameter Dw or the number-average particle diameter Dn. The polydispersity PD of the size of the polymer particles can be specified via the ratio of weight-average and number-average particle diameter: PD=Dw/Dn.

The prior art discloses various approaches to controlling the size of the polymer particles. For instance, DE 1595402 teaches the use of particular amounts of emulsifiers and/or protective colloids for this purpose. A decrease in the amount of emulsifiers and an increase in the amount of protective colloid lead to polymers having higher mean particle sizes. GB857514 describes processes for preparing polymers in the presence of protective colloids, emulsifiers and acetylenic di-tertiary alcohols, in which "fine particles" are obtained by complete metered addition of the monomers and "coarse particles", in contrast, by total addition of the monomers at the start of the polymerization. Disadvantageously, emulsifiers are indispensable for this process. DE102009008143 describes the preparation of vinyl acetate-ethylene copolymer dispersions having mean particle diameters Dw of 50 to 500 nm and polydispersities PD between 1.19 and 1.39, by polymerizing in the presence of emulsifiers and optionally protective colloids, using an amount of emulsifiers at least twice as large as that of protective colloids. DE 102006037317 describes coarsely particulate vinyl ester copolymers stabilized by protective colloid and emulsifier. Emulsifier-free dispersions and polymers having particle sizes Dw of less than 500 nm are not obtainable in this way. In addition, DE 102006037317 mentions that commercial, exclusively polyvinyl alcohol-stabilized vinyl acetate-ethylene copolymer dispersions typically have a mean diameter Dw=860 nm and a polydispersity PD=2.26.

DE 1260145 describes processes for emulsion polymerization of olefinically unsaturated compounds in the presence of modified polyvinyl alcohols and optionally emulsifiers, wherein, in the example, the total amount of polyvinyl alcohol is initially charged in the reactor and the total amount of monomer is metered in during the polymerization, which leads to a particle size of about 500 nm. Disadvantageously, the process does not allow controlled preparation of polymers having other mean particle sizes.

DE 1029565 describes processes for preparing aqueous polyvinyl ester dispersions, by which polymers having particle sizes of 500 nm to 15 μm can be prepared in a controlled manner, by using a particular combination of cellulose derivatives and alkali metal salts of oxydiphenyls and salts of inorganic or organic acids. These additional auxiliaries are deleterious to water resistance. Particle sizes less than 500 nm are unobtainable.

DE 10337183 describes the production of polymodal polymer dispersions having a polydispersity PD very much greater than 2, wherein at least two polyvinyl alcohols of different molar mass are initially charged in the reactor and ionic comonomers are polymerized. DE 10035589 describes the preparation of dispersions of high solids content, based on vinyl esters and ethylene without addition of emulsifier in the presence of protective colloid and seed latex. With weight-average particle sizes of greater than 2000 nm, polydispersities PD between 1.44 and 45.0 are obtained.

EP 1215219 describes the use of polyvinyl acetals as protective colloid. The process leads to polymer particles having polydispersities PD very much greater than 1.6. DE 19962566 describes the use of vinyl ester-(meth)acrylic ester copolymers in the presence of polyvinyl alcohol, wherein at least 50% by weight of the vinyl esters is initially charged. EP 1420033 describes the use of ethylene-modified polyvinyl alcohols. The processes of EP 1420033 and of DE 19962566 lead to polymers having mean particle sizes Dw of >700 nm and polydispersities PD of >1.6.

EP 1262465 describes emulsion polymerizations in the presence of protective colloids, wherein vinyl esters are polymerized in a first stage and (meth)acrylic esters in a second stage. In this way, only very coarse polymer dispersions having weight-average particle diameters Dw>2 μm are obtained, but particle sizes smaller than about 700 nm are unobtainable and the polydispersity PD in each case is much greater than 1.6.

EP 1420033 describes processes for preparing protective colloid-stabilized vinylaromatic-1,3-diene copolymers. Disadvantageously, only very coarse dispersions having weight-average diameters Dw>2.5 μm with high polydispersity PD>>1.6 are obtained.

EP 1788001 describes processes for producing polyvinyl alcohol-stabilized polymer dispersions by emulsion polymerization in the absence of emulsifier at temperatures above 100° C. This process too leads to polymer particles having weight-average particle sizes Dw above 800 nm with a broad particle size distribution PD>1.6.

DE 3227090 describes the production of aqueous dispersions by emulsion polymerization of vinyl halides and/or vinyl esters using protective colloids which are not added until after the polymerization has commenced. The particle sizes achieved, which are not specified in more detail in the description, are below about 1 µm with a broad distribution. Reworking of the process described in DE 3227090 in EP 0224169, in experiments in group A, however, gave a weight average of 1.87 µm combined with a polydispersity PD=9.35 in experiment A10 of EP 0224169 and, for experiment A11, a weight average of 1.35 µm combined with a polydispersity PD=7.1. EP 0224169 also showed that the processes described in DE 3227090 cannot be executed reproducibly. EP 0224169 describes finely divided, protective colloid-stabilized vinyl chloride-ethylene copolymer dispersions, the particles of which have not been partly flocculated, and which have weight-average particle sizes—determined in a disk centrifuge—of 150 nm to 500 nm and a polydispersity PD of not more than 1.8, where less than 50% by weight of the polymer particles are larger than 1000 nm. EP 0224169 does not disclose any suitable measures by which the particle sizes of the polymers can be varied in a controlled manner. In addition, polyvinyl halides are viewed in a negative light, and so there is a need to replace polyvinyl halides with other polymer systems, if possible without having to accept a loss of performance properties or other properties.

Overall, a wide variety of different variants of emulsion polymerization are thus known. For the production of protective colloid-stabilized vinyl ester polymers, usually at least a relatively large portion of the monomers and of the protective colloid or even the entire amount of protective colloid are included in the initial charge. The measures known to date, however, generally lead to polymer particles having weight-average particle sizes of greater than 700 nm or 800 nm with polydispersities PD>1.6 or even >2. One reason for this is particle aggregation processes that proceed in the course of the polymerization reaction, well after conclusion of the actual particle formation phase—as discussed, for example, in EP 0224169 under the topic of particle flocculation. The time, extent and result of these particle aggregation processes are dependent on the respective specific conditions of the process: if particle aggregation occurs at relatively low monomer conversion values, the particle aggregates formed have the opportunity to coalesce again during the polymerization to form homogeneous spherical particles; if, however, particle aggregation occurs at a relatively late stage and/or at high monomer conversion values, nonspherical particle aggregates may be present in the end product. These cause, for example, high dispersion viscosities. Overall, the known emulsion polymerization processes for preparation of vinyl ester polymers in the presence of protective colloids offer only limited opportunities for establishment of desired particle sizes, one particular reason being the particle agglomeration processes mentioned. Today, there is also no knowledge as to how finely divided dispersions, especially stabilized by protective colloid alone, having polydispersities PD<1.6 can be produced in a controlled manner.

Moreover, particle aggregates can be deaggregated under mechanical shear stress, which leads to changes in the particle size distribution and the dispersion viscosity. However, changes in such properties of the dispersions are undesirable and should be avoided.

The use of protective colloids, especially polyvinyl alcohols, in polymer dispersions is frequently desirable because of their advantageous performance properties. Unlike emulsifiers, they contribute, for example, to an increase in the mechanical strength of application products, for example in adhesives for paper, packaging or for wood gluing, but also in the case of use as a binder powder, for example in tile adhesives. Emulsifiers, especially emulsifiers of low molecular weight, can migrate within the binder film, which can lead to a change in its properties of the time, for example to a decrease in its strength. Moreover, it is desirable from an environmental point of view to dispense with emulsifiers of low molecular weight, especially with alkylphenol ethoxylates, and to work exclusively with protective colloids. There is consequently still a great need specifically for processes for controlled preparation of protective colloid-stabilized, finely divided vinyl ester polymers having particular settable particle diameters and low polydispersities PD.

SUMMARY OF THE INVENTION

It is therefore an object of the present invention to provide processes for producing protective colloid-stabilized aqueous dispersions of vinyl ester polymers,
(1) with which vinyl ester polymers having weight-average particle diameters Dw of 120 nm to 1500 nm and a polydispersity PD of <1.6, preferably PD≤1.5, even more preferably PD≤1.4, especially preferably PD≤1.3, if possible PD≤1.2 and specifically PD≤1.15 are formed,
(2) with which it is possible to prepare, in a controlled manner, weight-average particle diameters Dw of the vinyl ester polymers having desired values within the range from 120 nm to 1500 nm, the intention being to achieve a polydispersity PD<1.6, preferably PD≤1.5, even more preferably PD≤1.4, especially preferably PD≤1.3, if possible PD≤1.2 and specifically PD≤1.15,
(3) wherein the particles are substantially, preferably very substantially, in a non-aggregated, i.e. non-flocculated, state,
(4) which are preferably low in residue: it is required that the coagulate content, COA, takes on values <0.2% by weight, preferably 0.1% by weight, based on the total weight of the monomers used, and the screen residue SR has values of <1000 ppm, preferably values of <750 ppm;
(4a) wherein the viscosities, measured as Brookfield viscosities Bf20, are controllable within a wide range, for example within the range between 100 and 30 000 mPas, preferably between 100 and 15 000 mPas;
(5) which are free of vinyl halides and if possible essentially free of formaldehyde.

The methods for determining the coagulate content COA, the screen residue SR and the viscosity Bf20 are described further down in the "Test methods for characteristic dispersion parameters" section.

The object was surprisingly achieved by virtue of the concentration of the protective colloids having been within particular ranges before commencement of the polymerization, i.e. at the time of starting of the polymerization, and preferably also during the polymerization, especially in the initial phase or the particle-forming phase of the polymerization. In addition, it was found to be essential that the vinyl esters were not initially charged, but were instead metered in in full.

DETAILED DESCRIPTION OF THE INVENTION

Figure 1:
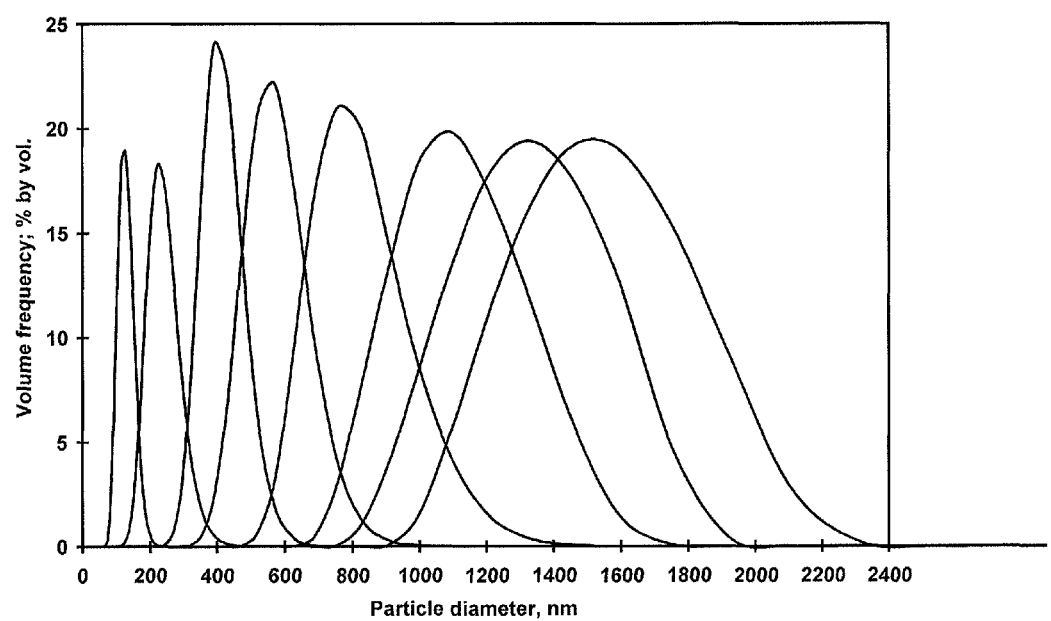
FIG. 1 shows volume frequency distributions of particle sizes obtained according to the invention.

The present invention provides processes for producing protective colloid-stabilized aqueous dispersions of vinyl ester polymers having weight-average particle diameters Dw of 120 nm to 1500 nm and a polydispersity PD of <1.6 by means of free-radically initiated emulsion polymerizations of one or more vinyl esters and optionally one or more further ethylenically unsaturated monomers in an aqueous medium in the presence of one or more protective colloids, characterized in that an aqueous mixture comprising 0 to 90 grams of one or more protective colloids per liter of water in the initial charge (concentration (C)) is initially charged and, commencing with or after the start of metered addition of one or more initiators, one or more protective colloids and the total amount of vinyl esters used are metered in, the emulsion polymerizations being performed in the absence of vinyl halides.

The invention further provides protective colloid-stabilized vinyl ester polymers obtainable by the aforementioned processes in the form of aqueous dispersions, and also the protective colloid-stabilized vinyl ester polymers obtainable by drying the aforementioned dispersions in the form of polymer powders, especially in the form of water-redispersible polymer powders. The process products are preferably free of emulsifiers.

The invention also provides for uses of the aforementioned process products, especially in the form of aqueous dispersions, as binders or coating materials, especially in or as adhesives or for treatment of textile fabrics.

The invention also provides for uses of the aforementioned process products in processes for free-radically initiated emulsion polymerization for production of polymer dispersions having solids contents of >60% by weight, preferably of 65% by weight, with polydispersities PD>1.6, and for uses of the dispersions thus produced.

Polydispersity PD represents the ratio of weight-average particle diameter Dw to number-average particle diameter Dn, PD=Dw/Dn. The parameters Dw and Dn are determined by means of laser light diffraction and laser light scattering with the LS13320 measuring instrument with the optical model PVAC.RF780D, including PIDS, from Beckmann-Coulter, using the physical constants for polyvinyl acetate and with reference to the instructions from the instrument manufacturer, after adequate dilution of the aqueous polymer dispersions with demineralized water. As is well known to those skilled in the art, results achieved with other instruments or test methods may differ from the results from the method specified here.

The vinyl ester polymers have weight-average particle diameters Dw between 120 nm and 1500 nm, preferably between 150 and 1200 nm, more preferably between 180 and 1100 nm, especially between 200 and 1000 nm and specifically between 220 and 900 nm. The vinyl ester polymers have a polydispersity PD<1.6, preferably PD≤1.5, even more preferably PD≤1.4, especially preferably PD≤1.3, if possible PD≤1.2 and specifically PD≤1.15.

It is essential for the inventive setting of the weight-average particle sizes Dw that 0 to 90 grams, preferably 0.1 to 75 grams, more preferably 1 to 65 grams, even more preferably 1 to 55 grams, especially 5 to 50 grams and specifically 10 to 45 grams of one or more protective colloids per liter of water are included in the initial charge (concentration (C)) in the reactor and, commencing with or after the start of metered addition of one or more initiators, one or more protective colloids and the total amount of vinyl esters used are metered in.

Commencing with or after the start of metered addition of one or more initiators, the total amount of vinyl ester is metered in over a period of preferably one hour up to 6 hours, especially preferably within 1.5 to 5 hours, more preferably within 2 to 4 hours. Within the period of metered addition, the metering rate of the vinyl esters may be constant or vary, for example be increased continuously or in stages.

The metered addition of one or more protective colloids is effected especially over a period of 1 to <30 minutes, preferably of 1 to 15 minutes, more preferably of 1 to 10 minutes and especially of 1 to 5 minutes after the start of the polymerization reaction or over a period of preferably up to 30 minutes, especially preferably of up to 20 minutes, more preferably of up to 15 minutes, especially of up to 10 minutes, after the start of metered addition of the protective colloids, at an addition rate of preferably 0.1 to 5 grams of protective colloid per liter of water in the initial charge and minute (initial addition rate (VZ)). The initial addition rate (VZ) thus has the unit g/(1 min). In later periods of time, i.e. after the metered addition of the protective colloids as per the initial addition rate, the metered addition of one or more protective colloids may be the same as the initial addition rate (VZ), or less than or greater than the initial addition rate (VZ). The statement of weight "grams of protective colloid" relates to the dry matter of protective colloid. The statement of volume "liter of water in the initial charge" relates to the amount of water in the initial charge before commencement of any metered addition. The provision of the initial charge ends with commencement of the metered addition of initiator. Metered additions, also called feeds or additions, generally include aqueous initiator solutions, aqueous protective colloid solutions and other aqueous solutions or emulsions comprising ethylenically unsaturated monomers.

The "start of the polymerization reaction" is after the start of the metered addition of initiator. The start of the polymerization reaction is recognizable by the heating of the polymerization mixture, for example when the polymerization mixture heats up by 0.1° C. to 1° C. As is well known, the rise in temperature depends on the particular reactor volume, the fill level thereof and the particular cooling conditions. The heating of the polymerization mixture is also recognizable by the switch in the temperature regulation to cooling. It may also be recognizable by an increase in the pressure in the reactor by 0.1 to 0.5 bar.

In general, the metered addition of one or more protective colloids is commenced when 0.0% to 10% by weight, preferably 0.0% to 6% by weight, more preferably 0.0% to 3% by weight, especially 0.0% to 1% by weight and specifically 0.0% by weight of one or more vinyl esters, based on the total weight of vinyl ester, has been metered in.

In general, the metered addition of protective colloid at the initial addition rate (VZ) is commenced within the period of 0.0 to <30 minutes, preferably within the period of 0.0 to 20 minutes, more preferably within the period of 0.0 to 15 minutes, even more preferably within the period of 0.0 to 10 minutes after commencement of the metered addition of vinyl ester; more particularly, the metered addition of protective colloid is commenced simultaneously with the start of metered addition of vinyl ester.

Combinations of the aforementioned ranges for the concentration (C) and the initial addition rates (VZ), and for the commencement of the metered addition of protective colloids, are particularly advantageous for optional control of the weight-average particle diameters Dw.

For the concentration (C) of protective colloid in the initial charge, the following ranges are preferred:

(a) For the production of particularly fine dispersions having weight-average particle sizes Dw from 120 to 200 nm, especially having solids contents of 30% to 55% by weight, preferably of 30% to 45% by weight, especially of 30% to 40% by weight, based on the total weight of the dispersions, preference is given to using concentrations (C) between 90 and 55, preferably between 85 and 60 grams of protective colloid per liter of water in the initial charge (dispersion (a)).

(b) For the production of dispersions having weight-average particle sizes Dw of greater than 200 to less than 500 nm, especially having solids contents of 30% to 55% by weight, preferably 45% to 55% by weight, based on the total weight of the dispersions, preference is given to using concentrations (C) between 55 and 15, preferably between 50 and 15 and especially 45 to 15 grams of protective colloid per liter of water in the initial charge (dispersion (b)).

(c) For the production of dispersions having weight-average particle sizes Dw of ≥500 nm, especially having solids contents of 30% to 60% by weight, preferably of 45% to 60% by weight and especially of 45% to 55% by weight, based on the total weight of the dispersions, preference is given to using concentrations (C) between 15 and 0.0 grams of protective colloid per liter of water in the initial charge (dispersion (c)).

For production of particularly stable and low-residue dispersions, it is particularly advantageous, according to the solids content of the particular dispersion to be produced, to use particular inventive concentrations (C) in the process according to the invention. In this context, there is a relationship between the solids contents of the dispersions and the concentrations (C), which is illustrated by the following general formula (I) as a linear correlation:

$$(C) \leq ((a-SC)/b) \quad \text{(I)}$$

in which (C) is the numerical value of the concentration (C), SC is the numerical value of the solids content SC of the particular dispersion produced by processes according to the invention, a may assume a value from the range from 80 to 86 and b may assume a value from the range from 0.50 to 0.60, where (C)≤90.

For production of dispersions having solids contents SC of 30% to <40% by weight, numerical values of the concentrations (C) of 0 to <78 are preferred, and values of 0 to <67 are especially preferred. For production of dispersions having solids contents SC of 40% to ≤45% by weight, numerical values of the concentrations (C) of 0 to 78 or 0 to 67 are preferred, and values of 0 to ≤82 or 0 to ≤69 or 0 to ≤58 are especially preferred. For production of dispersions having solids contents SC of 45% to ≤55% by weight, numerical values of the concentrations (C) of 0 to 82 or 0 to 69 or 0 to 58 are preferred, and values of 0 to ≤62 or 0 to ≤51 or 0 to ≤42 are especially preferred. For production of dispersions having solids contents SC of 55% to 60% by weight, numerical values of the concentrations (C) of 0 to 62 or of 0 to 51 or of 0 to 42 are preferred, and values of 0 to ≤52 or 0 to ≤42 or 0 to ≤32 are especially preferred.

For the initial addition rate (VZ) of protective colloid, preference is given to the following ranges:

(α) For the production of the particularly fine dispersions (a), the initial addition rate (VZ) is preferably 0.1 to 2 and especially 0.2 to 1.5 grams per liter of water in the initial charge and minute.

(β) For the production of the dispersions (b), the initial addition rate (VZ) is preferably 0.2 to 3 and especially 0.2 to 2 grams per liter of water in the initial charge and minute.

(γ) For the production of the dispersions (c), the initial addition rate (VZ) is preferably 0.3 to 5 and especially 0.3 to 3 grams per liter of water in the initial charge and minute.

For the production of dispersions having weight-average particle sizes Dw of 700 nm to 1500 nm, especially having solids contents of 30% to 60% by weight, preferably of 45% to 60% by weight, and especially of 45% to 55% by weight, based on the total weight of the dispersions, preference is given to concentrations (C) between 0.0 and 8 grams, especially between 0.1 and 6 grams, and specifically between 1 and 5 grams or else 0.0 grams of protective colloid per liter of water in the initial charge, and the initial addition rate (VZ) of the protective colloids is preferably between 0.3 and 3.0 grams per liter of water in the initial charge and minute, preferably between about 0.5 and 2.0 grams per liter of water in the initial charge and minute.

In general, the lower the concentration (C) of initially charged protective colloid selected and the lower the initial addition rate (VZ) of protective colloid selected, the greater the values that are obtained for the weight-average particle diameter Dw. Conversely, the higher the concentration (C) of initially charged protective colloid selected and the higher the initial addition rate (VZ) selected, the smaller the values that are obtained for the weight-average particle diameter Dw. Especially for low values of the concentration (C), the initial addition rate (VZ) has a particularly great influence on the weight-average particle sizes Dw.

Overall, preferably 3% to 15% by weight, especially preferably 4% to 12% by weight and especially 5% to 11% by weight of protective colloid is used, based on the total weight of all the monomers.

The setting of weight-average particle sizes Dw is effected essentially through the concentration (C) and optionally the initial addition rate (VZ), and not through the ratio of protective colloid and the total weight of all the monomers used. The weight-average particle sizes Dw of the polymers are not dependent on the absolute weight of protective colloid in the initial charge, but on the concentration thereof in the water in the initial charge. Mere statements regarding the distribution of protective colloid between initial charge and feed are accordingly entirely insufficient to be able to produce polymers having particular weight-average particle sizes Dw in a controlled manner by the present processes. Instead, the concentration of the protective colloids is characterized essentially by the parameters of concentration (C) and optionally the initial addition rate (VZ).

The weight of the overall initial charge is generally 10% to 30% by weight, preferably 12% to 28% by weight, and especially 14% to 26% by weight, based on the total weight of the dispersion after conclusion of the emulsion polymerization, the weight of the entire initial charge including all the components added to the initial charge before the start of metered addition of one or more initiators, such as water, protective colloid of concentration (C), and other components, including any monomers supplied to the initial charge.

In general, the solids content of the dispersions produced in accordance with the invention is 30% to 60% by weight, preferably 40% to 60% by weight, especially preferably 45% to 55% by weight and specifically 47% to 53% by weight, based on the total weight of the dispersion.

In general, the Brookfield viscosity Bf20 of the dispersions produced in accordance with the invention is 50 to 30 000 mPas, preferably between 100 and 15 000 mPas, more preferably between 100 and 10 000 mPas, especially between 200 and 5000 mPas, specifically 200 to 2000 mPas or 200 to 1000 mPas (for determination method see further down under point 1.2).

For the purposes of a very simple process regime, it may be preferable to keep the addition rate of protective colloid constant over the entire addition period, i.e. not to alter the initial addition rate (VZ) in further periods of metered addition, if permitted by the mass balance for the protective colloid content in the envisaged metering or addition periods. In this context, it is also preferable to keep the metering rate of vinyl ester constant over the entire period of metered addition of vinyl ester. The use of constant addition rates of protective colloid and constant feed rates of vinyl ester may lead to advantageous constant weight ratios of amounts of protective colloid and vinyl ester metered into the reactor.

The particle sizes of vinyl ester polymers obtained in processes according to the invention are generally characterized by a monomodal particle size distribution. For monomodal particle size distributions, the volume frequency distribution of particle size generally has exactly one maximum. Occasionally, certain proportions of fine or coarse particle fractions may also arise during the polymerization, and these form secondary maxima in the volume frequency distribution. Any secondary maximum of a coarse particle fraction is at greater particle diameters than the main maximum in the volume frequency distribution. Any secondary maximum of a fine particle fraction, in contrast, is at smaller particle diameters than the main maximum of the volume frequency distribution. The vinyl ester polymers produced in accordance with the invention contain not more than 6% by volume, preferably not more than 3% by volume, of fine particle fractions. The vinyl ester polymers produced in accordance with the invention contain not more than 6% by volume, preferably not more than 3% by volume, of coarse particle fractions.

In preferred embodiments of processes according to the invention:
(i) at least 70% by weight, based on the total weight of all the monomers used, of one or more vinyl esters are used;
(ii) the concentration (C) of protective colloid is 0.0 to 55 grams, especially 1 to 50 grams, per liter of water in the initial charge, especially for production of dispersions having solids content values between 45% and 55% by weight, based on the total weight of the dispersion;
(iii) protective colloid is metered in, commencing with or after the start of metered addition of one or more initiators, with an initial addition rate (VZ) of 0.1 to 5 grams of protective colloid per liter of water in the initial charge and minute, at least for a period of 1 to <30 minutes after the start of the polymerization reaction or for a period of 0 to <30 minutes after the start of metered addition of the initiators;
(iv) no vinyl ester is initially charged and no emulsifier is used,
(v) the metered addition of protective colloid is commenced when 0.0% to 5% by weight of vinyl ester has been metered in;
(vi) the metered addition of protective colloid is commenced with an initial addition rate (VZ) within the period of 0.0 to <30 minutes after commencement of the metered addition of vinyl ester; in particular, the metered addition of protective colloid is commenced simultaneously with the start of the metered addition of vinyl ester;
(vii) the addition rates of protective colloid and/or feed rates of vinyl ester are kept constant over the entire period of the metered additions;
(viii) the metered addition of vinyl ester and the metered addition of protective colloid commence at the same time;
(ix) the metered addition of vinyl ester and the metered addition of protective colloid end at the same time.

The monomers used in the process according to the invention include vinyl esters and optionally further ethylenically unsaturated monomers.

Vinyl esters are, for example, vinyl esters of carboxylic acids having 2 to 18 carbon atoms. Preferred vinyl esters are vinyl propionate, vinyl butyrate, vinyl 2-ethylhexanoate, vinyl laurate, 1-methylvinyl-acetate, vinyl pivalate and vinyl esters of α-branched monocarboxylic acids having 9 to 11 carbon atoms, known by the trade names VeoVa9® or VeoVa10®, and especially vinyl acetate. Vinyl esters can be used alone or in a mixture. It is preferable that, when vinyl ester mixtures are used, the proportion of vinyl acetate is at least 70% by weight, based on the total weight of the vinyl esters used. It is also preferable to use vinyl acetate alone.

Further ethylenically unsaturated monomers may be selected, for example, from the group comprising esters of acrylic acid or methacrylic acid of unbranched or branched alcohols having 1 to 15 carbon atoms, olefins or dienes.

Preferred methacrylic esters or acrylic esters are esters such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate.

Suitable olefins are, for example, propylene and especially ethylene.

The emulsion polymerization is performed in the absence of vinyl halides. Examples of vinyl halides are vinyl chloride.

Optionally, it is additionally possible to copolymerize auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and maleic anhydride, ethylenically unsaturated sulfonic acids or salts thereof, preferably vinylsulfonic acid, 2-acrylamido-2-methyl-propanesulfonic acid.

Further examples are precrosslinking comonomers such as polyethylenically unsaturated comonomers, for example divinyl adipate, diallyl maleate, allyl methacrylate or triallyl cyanurate, or postcrosslinking comonomers, for example acrylamido-glycolic acid (AGA), methylacrylamidoglycolic acid methyl ester (MAGME), N-(isobutoxymethyl)acrylamide (IBMA), N-(isobutoxymethyl)-methacrylamide (IBMMA), N-methylolacrylamide (NMA), N-methylolmethacrylamide (NMMA), N-methylolallyl carbamate, alkyl ethers such as the isobutoxy ether or esters of N-methylolacrylamide, of N-methylolmethacrylamide and of N-methylolallyl carbamate. Also suitable are epoxy-functional comonomers such as glycidyl methacrylate and glycidyl acrylate. Further examples are silicon-functional comonomers such as acryloyloxypropyltri(alkoxy)- and methacryloyloxypropyltri(alkoxy)silanes, vinyltrialkoxysilanes and vinylmethyldialkoxysilanes, where for example methoxy, ethoxy and ethoxy propylene glycol ether radicals may be present as alkoxy groups. Other examples are monomers having hydroxyl or CO groups, for example hydroxyalkyl methacrylate and acrylate, such as hydroxyethyl, hydroxypropyl or hydroxybutyl acrylate or methacrylate, and also compounds such as diacetoneacrylamide and acetylacetoxyethyl acrylate or methacrylate.

Preferred auxiliary monomers are acrylamides such as acrylamide and N-methylolacrylamide, and hydroxyethyl acrylate.

Preferred monomer mixtures comprise at least 70% by weight of one or more vinyl esters, of which preferably up to 100% by weight and especially preferably 50% to 100% by weight and especially 70% to 100% by weight of vinyl acetate, based on the total weight of vinyl ester, and up to 30% by weight of ethylene, preferably 4% to 25% by weight of ethylene, based in each case on the total weight of all the monomers used, where the proportions thereof add up to 100% by weight. The dispersions obtainable thereby are preferably used as binders or adhesives or for production of polymer powders, especially of water-redispersible polymer powders.

Further preferred monomer mixtures comprise at least 90% by weight, preferably at least 95% by weight, of one or more vinyl esters, based on the total weight of all the monomers used, and one or more acrylamides, especially N-methylolacrylamide, optionally in the form of aqueous mixtures with acrylamide, N-(isobutoxymethyl)acrylamide (IBMA), N-(isobutoxymethyl)methacrylamide (IBMMA), N-(n-butoxy-methyl)acrylamide (NBMA) or N-(n-butoxymethyl)methacrylamide (NBMMA). Particular preference is given to N-(isobutoxymethyl)acryl-amide (IBMA) or N-(n-butoxymethyl)acrylamide (NBMA). Aqueous mixtures having a molar ratio of about 1:1 of N-methylolacrylamide and acrylamide are also known by the name "NMA-LF" or "MAMD".

For the preferred monomer mixtures mentioned, vinyl esters used are preferably vinyl acetate and one or more vinyl versatates, where the proportion of vinyl acetate is at least 70% by weight, preferably at least 80% by weight, based on the total weight of the vinyl esters. Acrylamides are used in the monomer mixtures in proportions of preferably up to 3% by weight, especially preferably in proportions of 2% to 0.1% by weight, especially to an extent of 2 to 0.5% by weight, where the proportion of N-methylolacrylamide is not more than 1% by weight, based on the total weight of all the monomers used. Specifically, however, no N-methylolacrylamide is used. The polymers containing acrylamides that are thus obtainable are preferably used as or in adhesives for water-resistant wood bonds that meet the DIN EN 204/205 water resistance demands of D3/3, at least 2 N/mm$^2$, or of D3/3 and D4/5, at least 4 N/mm$^2$.

In a further preferred embodiment, vinyl acetate and ethylene and optionally one or more further vinyl esters and optionally one or more acrylic esters and optionally one or more further ethylenically unsaturated monomers are used, the resulting polymers having a glass transition temperature Tg in the range from preferably 20 to 30° C. Polymer dispersions of this kind are preferably used as or in aqueous binders for treatment of textile fabrics, especially in the form of a carpet that has been coated or partly impregnated on the reverse side from the tread side with products obtainable by the aforementioned processes.

Any further ethylenically unsaturated monomers or auxiliary monomers used can be added to the initial charge at a separate place and time from vinyl esters, or be metered in with or after the start of metered addition of one or more initiators.

Ethylene is preferably injected entirely or partly into the aqueous initial charge in the reactor. In general, the pressures that may occur are between 3 bar and 100 bar, particularly between 5 and 80 bar.

Preferably, further monomers or auxiliary monomers are metered in in their entirety with or after the start of metered addition of one or more initiators. Preferably, the metered addition is effected in a mixture with vinyl ester. Water-soluble auxiliary monomers are preferably added to the reactor in an aqueous feed; this aqueous feed is, for example, also an aqueous feed containing the protective colloid added. It may be advantageous to add the auxiliary monomers with a time offset from the metered addition of the vinyl esters. In general, metered additions of monomers and/or auxiliary monomers end before or simultaneously with the metered addition of vinyl ester. In individual cases, it is possible that the metered addition of vinyl ester is ended before the metered addition of other monomers. In general, however, a metered addition of ethylene, if employed, is ended before the metered addition of vinyl ester is ended.

Suitable protective colloids are generally water-soluble polymers. The solubility of the water-soluble polymers in water under standard conditions to DIN50014 is generally >1 g/100 ml. Examples of protective colloids are partly hydrolyzed or fully hydrolyzed polyvinyl alcohols; polyvinylpyrrolidones; polyvinyl acetals; polysaccharides in water-soluble form, such as starches (amylose and amylopectin) or dextrins or cyclodextrins, celluloses and the carboxymethyl, methyl, hydroxyethyl and hydroxypropyl derivatives thereof; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine formaldehydesulfonates, naphthalene formaldehydesulfonates, styrene-maleic acid and vinyl ether-maleic acid copolymers. The protective colloids mentioned are obtainable by means of processes known to those skilled in the art. Preferred protective colloids are cellulose derivatives, polyvinylpyrrolidones or especially polyvinyl alcohols. Preference is also given to mixtures comprising polyvinyl alcohols and cellulose derivatives and/or polyvinylpyrrolidones or mixtures comprising cellulose derivatives and polyvinylpyrrolidones.

Preferred cellulose derivatives are hydroxyethyl celluloses, preferably having viscosities of ≤6500 mPas, more preferably of ≤3500 mPas, especially preferably of ≤1500 mPas and especially of ≤500 mPas, determined in 2% by weight aqueous solutions at 23° C. by means of the Höppler viscometer. Preferred polyvinylpyrrolidones have K values between 10 and 30. K values of the polyvinylpyrrolidones are calculated from viscosity measurements on aqueous solutions at 20° C. by means of an Ubbelohde viscometer for concentrations in the range between 0.1 and 10 g/100 ml, especially in the range of 1 to 5 g/100 ml, from the intrinsic viscosity k familiar to those skilled in the art according to Fikentscher, Cellulosechemie 13(1932)58.

Preference is given to partly hydrolyzed polyvinyl alcohols having a hydrolysis level of 80 to 96 mol %, especially 86 to 96 mol % and more preferably 86 to 90 mol %, especially having a Höppler viscosity in 4% by weight aqueous solution of 1 to 30 mPas (Höppler method at 20° C., DIN 53015). The partly hydrolyzed polyvinyl alcohols preferably have a mass-average polymerization level of 200 to 4000. Preference is also given to fully hydrolyzed polyvinyl alcohols having a hydrolysis level of 96.1 to 99.9 mol %, preferably 97.5 to 99.5 mol %, for example having a mass-average polymerization level of 200 to 3500. It is also possible to use mixtures of partly hydrolyzed and fully hydrolyzed polyvinyl alcohols. The aforementioned partly hydrolyzed and fully hydrolyzed polyvinyl alcohols are also referred to hereinafter as standard polyvinyl alcohols S-PVOH.

Preference is also given to modified polyvinyl alcohols, also called X-PVOH hereinafter, having a hydrolysis level of 80 to 99.9 mol %, preferably of 85 to 95 mol %, and a Höppler viscosity in 4% aqueous solution of 1 to 30 mPas (determination to DIN 53015 at 20° C.) Examples thereof are polyvinyl alcohols bearing functional groups, such as acetoacetyl groups. Further examples are partly hydrolyzed copolymers of vinyl acetate with hydrophobic comonomers such as isopropenyl acetate, vinyl pivalate, vinyl ethylhexanoate, vinyl esters of saturated alkyl-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, olefins such as decene, styrene. The proportion of the hydrophobic units is preferably 0.1% to 10% by weight, based on the total weight of the partly hydrolyzed polyvinyl alcohol. Further preferred polyvinyl alcohols are partly hydrolyzed, hydrophobized polyvinyl alcohols which are obtained by polymer-analogous reaction, for example acetalization of the vinyl alcohol units with C1 to C4 aldehydes such as butyraldehyde. The proportion of the hydrophobic units is preferably 0.1% to 10% by weight, based on the total weight of the partly hydrolyzed polyvinyl acetate. The hydrolysis level is from 80 to 99.9 mol %, preferably 85 to 95 mol %, the Höppler viscosity (DIN 53015, Höppler method, 4% aqueous solution) from 1 to 30 mPas, preferably 2 to 25 mPas. It is also possible to use mixtures of the polyvinyl alcohols mentioned.

Preference is also given to polyvinyl alcohols containing ethylene units, called E-PVOH, which are known, for example, by the EXCEVAL® trade name. E-PVOH are partly or preferably fully hydrolyzed copolymers of vinyl acetate and ethylene. Preferred E-PVOH have an ethylene content of 0.1 to 12 mol %, preferably 1 to 7 mol %, especially preferably 2 to 6 mol % and especially 2 to 4 mol %. The mass-average polymerization level is 500 to 5000, preferably 2000 to 4500 and especially preferably 3000 to 4000. The hydrolysis level is generally greater than 92 mol %, preferably 94.5 to 99.9 mol % and especially preferably 98.1 to 99.5 mol %. Of course, it is also possible and may be advantageous to use mixtures of the various ethylene-modified polyvinyl alcohols E-PVOH alone or in combination with partly hydrolyzed and/or fully hydrolyzed standard polyvinyl alcohols S-PVOH or with differently modified X-PVOH.

Most preferred are partly hydrolyzed or especially fully hydrolyzed polyvinyl alcohols. Preference is given to using S-PVOH alone or in combination with X-PVOH, especially with E-PVOH. The use of E-PVOH and/or of differently modified X-PVOH alone, or in combination with S-PVOH, is advantageous especially in the case of use of the inventive process products as or in adhesives for water-resistant wood bonds.

If individual polyvinyl alcohols or mixtures of polyvinyl alcohols of the S-PVOH or/and E-PVOH or/and X-PVOH type are used, it may be advantageous that the viscosities thereof in 4% by weight aqueous solutions at 23° C. assume values from the ranges of 3 to 6 mPas, or 6.1 to 10 mPas, or 10.1 to 15 mPas, or 15.1 to 20 mPas (Höppler viscosity determined to DIN 53015).

In the processes according to the invention, it is also possible to polymerize in the presence of emulsifier. It is possible to use, for example, ≤50% by weight or preferably ≤20% by weight, based on the amount used, of protective colloid. It is also possible to use ≤2% by weight, preferably ≤1% by weight, based on the total weight of the monomers used, of emulsifiers. Preferably, however, no emulsifiers are used during the polymerization in the processes according to the invention.

Examples of emulsifiers are anionic or nonionic emulsifiers, for example anionic surfactants such as alkyl sulfates having a chain length of 8 to 18 carbon atoms, alkyl or alkylaryl ether sulfates having 8 to 18 carbon atoms in the hydrophobic residue and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

Any emulsifier used may be distributed between initial charge and feeds, although generally not more than 50% by weight, based on the total weight of the emulsifiers used overall, is used in the initial charge; more preferably, optional emulsifier is metered in in full. Emulsifiers can also be added to the dispersions after conclusion of the polymerization. However, the inventive process products are preferably free of emulsifiers.

The polymerization temperature is generally 40° C. to 95° C., preferably 45° C. to 90° C., especially 45° C. to 75° C., and specifically 45° C. to 55° C.

The polymerization is initiated with the initiators commonly used for emulsion polymerization, for example oxidizing agents or especially redox initiator combinations. A distinction is made between compounds that have oxidative properties and those that have reductive properties; as is well known, they are referred to as oxidizing agents on the one hand and reducing agents on the other hand.

Examples of suitable oxidizing agents are t-butyl hydroperoxide, potassium peroxodiphosphate, t-butyl peroxopivalate, cumene hydroperoxide, isopropylbenzene monohydroperoxide, azobisisobutyronitrile, and especially sodium salts, potassium salts and ammonium salts of peroxodisulfuric acid (persulfates), hydrogen peroxide, t-butyl peroxide.

Suitable reducing agents are the sulfites and bisulfites of the alkali metals and of ammonium, for example sodium sulfite, the derivatives of sulfoxylic acid, such as zinc or alkali metal formaldehydesulfoxylates, for example sodium formaldehydesulfoxylate (SFS), and (iso)ascorbic acid and tartaric acid. Preference is given to using (iso)ascorbic acid and salts thereof, for example sodium isoascorbate, and tartaric acid.

It is preferable not to use any formaldehyde-releasing agents; in particular, the use of sodium formaldehydesulfoxylate (SFS) is ruled out in the processes according to the invention.

The initiators are generally used in an amount of 0.05% to 3% by weight, based on the total weight of the monomers. In particular, during the polymerization reaction, oxidizing agents are used in an amount of 0.04% to 1.5%, preferably of 0.1% to 1.0% or of 0.1% to 0.5% by weight, based on the total weight of the monomers. In particular, during the polymerization reaction, reducing agents are used in an amount of 0% to 1.5%, preferably of 0.1% to 1.0% or of 0.1% to 0.5% by weight, based on the total weight of the monomers.

The formation of free radicals can be effected by thermal means with the sole use of oxidizing agents, preferably of persulfates, or by means of redox initiator combinations. Among the redox combinations, for example, preference is given to the use of persulfates or of t-butyl hydroperoxide and ascorbic acid or sodium isoascorbate, the use of hydrogen peroxide and ascorbic acid or sodium isoascorbate or tartaric acid. In the case of use of redox combinations, it may be advantageous to use catalytic amounts of transition metal compounds, for example ferric ammonium sulfate or copper sulfate. In special cases, it may be advantageous to dispense with the use of the transition metal compounds mentioned.

Initiators are generally metered in as aqueous solutions. It is possible to add a portion of initiators, especially reducing agents, to the initial charge in the reactor. Such an addition of reducing agents does not mark the commencement of the feeds of initiator. When redox initiator combinations are used, the addition of oxidizing agent marks the commencement of the feeds of initiator.

The initiator solutions are generally metered in at separate places. The metered addition can be effected at constant rates or at rates that vary with time. For example, a higher rate can be provided at the start, in order to initiate the reaction, than later on in the reaction. In general, the feeds of initiator are continued after all the monomers used have been metered in. In this phase of polymerization to completion, the metering rates and/or concentrations of the feeds of initiator can be increased, for example. If redox initiation is being employed, which is preferable, the concentrations and/or the metering rates of oxidizing agent and reducing agent are matched to one another such that a molar ratio of reducing agent to oxidizing agent in the region of 0.2:1, preferably in the region of 0.5:1, is achieved at least when the feeds of initiator are ended. However, it may be helpful to depart from this ratio in individual phases of the reaction, and to work with a ratio of 2:1 or of 1:1.

To prepare polymers having weight-average particle sizes of less than 500 nm, persulfates are preferred; for weight-average particle sizes of greater than 600 nm, t-butyl hydroperoxide is the preferred oxidizing agent.

During the polymerization, the reaction mixture is generally mixed using stirring assemblies so as to ensure maximally uniform distribution of the components and removal of heat of reaction.

In general, the pH during the reaction is set to values between 2 and 8, preferably between 3 and 6. In the individual case, it may be favorable to keep the pH between 3.5 and 6 or between 4 and 6, or else between 4.5 and 5.5. The pH of the dispersion obtained is usually set to values between 4 and 6, especially between 4 and 5. The pH adjustment or regulation of the pH can be effected with acids such as sulfuric acid, formic acid, acetic acid; or with bases such as ammonia, sodium hydroxide solution, potassium hydroxide solution, amines; or through use of buffer substances such as alkali metal acetate, alkali metal carbonate, alkali metal diphosphates.

In general, the procedure in the processes according to the invention is to initially charge an aqueous initial charge, preferably containing polyvinyl alcohol as protective colloid in a concentration (C) in the reactor, and to heat it to a desired temperature; a portion of ethylene, if ethylene is used as monomer, for example at least 20% by weight, preferably at least 50% by weight, of the total ethylene is injected before or during the heating operation. At the desired temperature, for example at 50° C., the parallel metered addition of oxidizing agent and reducing agent is commenced and, shortly thereafter, the metered addition of vinyl ester, optionally in a mixture with further monomers or auxiliary monomers. Water-soluble auxiliary monomers are metered in, for example, in an aqueous feed, in parallel with or with a time offset from the vinyl ester. In the case of use of ethylene, ethylene fractions that have not been initially charged are likewise added in the course of the metering phase of vinyl ester, for example at constant pressure or with a selected mass flow rate. In the course of the metering phase, the temperature, for example, is kept very substantially constant, but it is also possible to increase temperature in accordance with any desired regime. On conclusion of the feeds of vinyl ester, other monomer or auxiliary monomer, the feeds of initiator are continued until monomer conversion is complete, but at least until the content of unconverted vinyl ester has fallen to less than 2% by weight, preferably less than 1% by weight, based on the total weight of dispersion. This fraction of residual monomer is removed, for example, by further polymerization with generally more concentrated solutions of oxidizing agent and reducing agent and/or by known steam stripping.

Further additives can be added to the dispersions thus obtained, for example further protective colloids, emulsifiers, biocides, fillers and pigments, film-forming aids, wetting agents, viscosity modifiers or urea. For example, film-forming aids, preferably butylcarbitol acetate and/or propylene carbonate, are generally added to dispersions that are to be used as wood adhesives.

Surprisingly, the processes according to the invention enable production of vinyl ester polymers having particle sizes Dw in the range from 120 nm to 1500 nm with low polydispersity PD of <1.6. Surprisingly, processes according to the invention additionally enable controlled production of vinyl ester polymers having particular particle sizes Dw from the range from 120 nm to 1500 nm in a specific manner and even simultaneously with low polydispersity PD of <1.6. The processes according to the invention thus allow controlled production of vinyl ester polymers with any weight-average particle diameter according to the invention. At the same time, it is possible, after a "particle formation phase", which leads to the formation of a particular number of particles, to substantially, if not completely, suppress both particle aggregations and new particle formation in the further course of the polymerization. This is a reason for the low polydispersity PD of the inventive vinyl ester polymers. The polymers obtained in processes according to the invention are thus advantageously in the form of spherical particles in a non-flocculated state. Surprisingly, in processes according to the invention, particle aggregation processes, for example when the particle formation phase is complete, are substantially, if not completely, avoided, which is a prerequisite for the achievement of a low polydispersity PD<1.6. For all of these, the concentration (C) of protective colloid in the aqueous initial charge in the reactor has been found to be essential and also the initial addition rate (VZ) of protective colloid has been found to be beneficial. The "particle formation phase" is a period of time at the start of the polymerization reaction, which is relatively short compared to the duration of the overall polymerization, in which polymer particles (mature latex particles) are formed, the number of which remains substantially constant later on in the polymerization in the processes according to the invention, and the size of which increases predominantly, if not exclusively, through further conversion of monomer to polymer to the particle diameter Dw, or Dn, obtained after conclusion of the polymerization, with a polydispersity PD.

It was also particularly surprising that vinyl ester polymers are now also obtainable in the form of protective colloid-stabilized dispersions having weight-average particle sizes Dw well below one micrometer, especially having weight-average particle sizes Dw<700 nm, or Dw<500 nm, or Dw<400 nm, with low polydispersities PD of PD<1.6 or PD<1.3 or PD<1.2 or even PD<1.15.

The processes according to the invention enable, for example, setting of the viscosity of the dispersions obtained, both via the weight-average particle sizes Dw and via the composition of the protective colloid, preferably via the use of polyvinyl alcohol with selectable weight-average polymerization levels. With the process according to the invention, it is surprisingly also possible to set the viscosity of the dispersion and a weight-average particle size Dw independently of one another.

If, in contrast, higher concentrations of protective colloid (C) than the inventive concentrations are used in the aqueous initial charge, either fine particle fractions having proportions by volume of >6% by volume are obtained or the dispersion is no longer stable over the course of the polymerization, which can lead, for example, to formation of high proportions of coagulate COA or screen residue SR or to complete coagulation. These conclusions are particularly valid when the aqueous dispersions are produced with inventive solids contents.

If no protective colloid is added with or after the start of the metered addition of one or more initiators in the period of time according to the invention, increased coagulate formation can occur and/or coarse particle fractions having proportions by volume of more than 6% by volume are formed. Through the inventive metered addition of protective colloid with an initial addition rate (VZ), in contrast, it is possible to counter the formation of coagulate COA and high proportions of screen residue SR and/or to avoid coarse particle fractions having proportions by volume of more than 6% by volume, and to advantageously affect the obtaining of the polydispersity PD according to the invention.

If vinyl esters, contrary to the inventive procedure, are initially charged at least in part, this is deleterious firstly to the discretionary controllability of the weight-average particle sizes Dw within the range from 120 nm to 1500 nm. Secondly, in the case of partial initial charging of vinyl ester, coarse particle fractions having proportions by, volume of >6% by volume can form.

In general, the dispersions obtained by the processes according to the invention can be used as binders, or as adhesives or in the form of the powders obtained from the dispersions. In this context, a particular possible use is as an adhesive for cellulosic materials, such as paper, paperboard or wood with one another or with other substrates. A further field of use is the binding of fibrous materials, for example nonwoven textiles. The dispersions can also be used in formulations of water-thinnable paints. Preferred applications of the dispersions are in or as adhesives for water-resistant wood bonds, especially for those that satisfy the D3 and/or D4 stress group according to DIN EN204/205, or as or in aqueous binders for treatment of textile fabrics, especially in the form of a carpet which has been coated or partly impregnated on the reverse side from the tread side with the products obtainable by the aforementioned processes.

The protective colloid-stabilized vinyl ester polymers in the form of water-redispersible polymer powders are obtainable by drying the abovementioned dispersions. The drying can be effected here by processes known to those skilled in the art, for example by spray drying. For this purpose, it may be helpful to use drying aids, for example a spraying aid, especially the abovementioned protective colloids, preferably the abovementioned polyvinyl alcohols. The redispersible dispersion powders can be used in the areas of application typical therefore, for example in construction chemical products, optionally in conjunction with hydraulically setting binders such as cements (portland cement, aluminate cement, trass cement, slag cement, magnesia cement, phosphate cement), gypsum and waterglass, for the production of construction adhesives, especially tile adhesives and thermal insulation composite adhesives, renders, spackling compounds, floor spackling compounds, leveling compounds, sealing compounds, grouts and, paints, and for concrete modification.

Since it has surprisingly been possible here by the processes according to the invention to provide dispersions having controllable weight-average particle sizes Dw, the process products are outstandingly suitable for use as "seed latex" in free-radical emulsion polymerization processes for production of high-solids dispersions having solids contents of >60% by weight, especially from ≤65% by weight, based on the total weight of the dispersion, having viscosities of preferably ≤30 000 mPas, preferably ≤20 000 mPas and especially of ≤10 000 mPas. These dispersions are notable for high polydispersity PD of generally PD>1.6. High-solids protective colloid-stabilized dispersions find use, for example, in or as adhesives. Process products used as "seed latex" generally have a solids content of 30 to 60% by weight, based on the total weight of the "seed latex", but preferably a solids content of at least 45% by weight. In the production of high-solids dispersions, measures for establishing adequate colloid stability and viscosity are generally required. In general, sufficient flowability of high-solids dispersions is achieved by production of very broad and generally polymodal, e.g. bimodal, particle size distribution, as described, for example, in DE2837992, U.S. Pat. No. 5,679,735, EP0789035, DE3036696, DE3147008, DE10337183 or DE10035589.

EXAMPLES

1. Test Methods for Characteristic Dispersion Parameters 1.1 Solids Content/Drying Residue (SC)

To determine the solids content, in % by weight based on dispersion, on conclusion of the polymerization, about 0.3 g of polymer dispersion is weighed out and dried as a thin film on a piece of aluminum foil in an air circulation drying cabinet at 150° C. for 30 minutes. After cooling in a desiccator over silica gel, the drying residue was reweighed, and the solids content SC in % by weight, based on dispersion, was calculated from residue and starting weight.

1.2 Viscosity (Bf20)

The viscosity of the dispersion was measured at 20 rpm after equilibration to 23° C. with a Brookfield viscometer according to the equipment instructions. The spindles used are listed for each of the examples and comparative examples. The viscosity is reported in mPas.

1.3 Characterization of the Particle Sizes

To determine a particle size distribution with the LS13320 instrument from Beckmann Coulter® Inc. according to the equipment instructions, using the physical constants for polyvinyl acetate, with the optical model PVAC.RF780D, the dispersion was diluted sufficiently with water. Coagulate, COA, and coarsely particulate fractions, SR, the determination of which is described in point 1.4, were removed beforehand by means of 40 μm screen fabric, since these can distort the analysis result. To produce the dilutions for analysis, water was first added dropwise to the concentrated dispersions while stirring and diluted to concentrations of solids content 10% to 25% by weight. These diluted dispersions were used to produce the sufficiently diluted solutions for analysis.

The dispersity or particle size was quantitatively characterized using the weight-average particle diameter Dw, the number-average particle diameter Dn and the central value, also known as the median value, of the volume distribution, D3,50, the values displayed as analysis results of the measurements with the LS13320.

Also provided as analysis results by the LS13320 instrument are data for the volume frequency distribution as tabular values of proportions by volume of particles of defined particle diameter as a function of the particle diameter, the sum total of all the proportions by volume for all the particle diameters defined being 100 percent by volume. These data are utilized while observing the principles familiar to those skilled in the art relating to the representation of the figures detailed below.

1.4 Coagulate, COA, and Screen Residue, SR

The dispersions were first subjected to coarse filtration through a 1 mm screen. The coarse coagulate residue remaining on the screen was dried and weighed. The amount thereof is expressed in relation to the total amount of monomers used and reported as COA in % by weight. The remaining residue of the dispersion reported in parts per $10^6$, based on dispersion (ppm), characterizes coarsely particulate fractions in the dispersion having dimensions greater than 40 μm. To determine such fractions, which should be kept to a minimum, 100 grams of the dispersion were diluted with one liter of distilled water, then poured through a nylon screen fabric of mesh size 150 μm, and the material that passed through was filtered through a screen fabric of mesh size 40 μm. In each case, the material was rinsed with water until the water passing through was clear. The residue on the screen fabrics was dried and then reweighed, and the screen residue per screen fabric was calculated, based on the dispersion. The total residue on the two screens larger than 40 μm is reported here as SR.

2. General Polymerization Methods

3-Liter Glass Reactor

For all the polymerizations, except for the pressure polymerization for examples 26 and 27, a jacketed 3-liter glass reactor equipped with electronic temperature measurement and regulation, a reflux condenser and at least four means of metered addition for parallel metered addition of two initiator components (feed 1 for the oxidizing agent and feed 2 for the reducing agent, if used), monomer or monomer mixture (feed 3) and an aqueous solution (feed 4) comprising polyvinyl alcohol and any water-soluble auxiliary monomers.

Stirring was accomplished using a finger stirrer having 6 fingers; the speed was variable and, unless stated otherwise, was 150 rpm over the entire course of the polymerization.

After adding the aqueous portion of the initial charge of the reactor, comprising polyvinyl alcohol of defined concentration (C), set to a pH defined in each case, and generally comprising defined amounts of ferric ammonium sulfate (FAS), the reactor was evacuated, the vacuum was broken with nitrogen, and nitrogen was passed through the reactor for at least 5 minutes. Subsequently, the temperature was adjusted to target temperature and, at target temperature, the generally parallel addition of the aqueous feeds 1, comprising the oxidizing agent, and feed 2, comprising the reducing agent, or only of feed 1, was commenced. Feeds 1 and 2 were, unless stated otherwise, metered in at constant rates of 20 ml/h. Unless stated otherwise, the metering rates of feeds 1 and 2 were not altered over the course of the polymerization. No later than 5 minutes after starting feeds 1 and 2, feed 3, comprising monomer, was started, and the metering rate thereof, unless stated otherwise, was kept constant for the entire period of metered addition of generally 180 minutes. Simultaneously with the start of feed 3, unless stated otherwise, feed 4, comprising the polyvinyl alcohol metered in, was started and added to the reactor in parallel to feed 3, at constant rate unless stated otherwise. In some cases, feed 4 was started after 5 minutes had elapsed after commencement of feed 3.

Feeds 3 and 4 were generally ended at the same time. Feeds 1 and 2 continued for a period between 15 and 55 minutes after the end of feeds 3 and 4.

Subsequently, the contents of the reactor were cooled. After the contents of the reactor had cooled, they were adjusted with a 10% by weight aqueous solution of sodium hydroxide to a preset target pH, unless stated otherwise, of 4.5.

The analysis data according to points 1.1 to 1.4 were ascertained and are listed in tables 2 and 3. For the viscosity measurement according to point 1.2, unless stated otherwise, spindle 2 was used.

Pressure Reactors

The polymerizations for examples 26 and 27 were conducted in customary pressure reactors having reactor volumes of 17 liters (example 27) or 600 liters (example 26), equipped with electronic temperature measurement and regulation, a multilevel paddle stirrer with variable speed, safety valve and means of metered addition for at least five feeds for parallel metered addition of two initiator components (feed 1 for the oxidizing agent and feed 2 for the reducing agent), monomer or monomer mixture (feed 3) and an aqueous solution comprising polyvinyl alcohol (feed 4) and for ethylene (feed 5, if used). The procedure corresponded to the details for the 3-liter glass reactor, except that the vacuum applied initially was broken with initial charging of a defined amount of ethylene. The speed was variable and was 200 rpm for example 26, or 350 rpm for example 27.

3. Raw Materials

All the raw materials used were industrial products, in standard technical purity gradients for commercial products available on the market, which were not subjected to any specific pretreatment. "Water" used was water demineralized by ion exchange. The protective colloids used were polyvinyl alcohols which are listed and characterized in table 1. As well as vinyl acetate (VAC), the following monomers were used: vinyl laurate (VL), vinyl versatate VeoVa® 9, ethylene (Eth); butyl acrylate (BA), N-methylolacrylamide (NMA) and styrene. Oxidizing agents used were sodium persulfate (NaPS), hydrogen peroxide ($H_2O_2$) and t-butyl hydroperoxide (t-BHP). Reducing agents used were sodium isoascorbate (Na-iAsc), tartaric acid, ascorbic acid (AscSr) and, (only) for comparative example C7, sodium formaldehydesulfoxylate (SFS).

TABLE 1

Characteristics of the polyvinyl alcohols used (Polyviol, Mowiol and EXCEVAL are protected brand names)

| PVOH type | Name | Viscosity (4% solution mPas) | Mean hydrolysis level [mol %] | Specific features |
|---|---|---|---|---|
| A | Polyviol M04/140 | 3.8 | 88.0 | S-PVOH |
| B | Polyviol M05/140 | 4.8 | 88.0 | S-PVOH |
| C | Mowiol 4/88 | 4.0 | 88.0 | S-PVOH |
| D | Mowiol 8/88 | 8.0 | 88.0 | S-PVOH |
| E | Mowiol 18/88 | 18.0 | 88.0 | S-PVOH |
| F | Polviol (X-PVOH) | 4.5 | 88.0 | contains 1% VeoVa10 |
| G | EXCEVAL RS2117 | 26.5 | 98.3 | E-PVOH contains ethylene |
| H | EXCEVAL HR3010 | 14.0 | 99.2 | E-PVOH contains ethylene |
| I | Mowiol 6/98 | 6.0 | 98.4 | S-PVOH |
| J | Mowiol 30/98 | 29.0 | 98.4 | S-PVOH |

The polyvinyl alcohols listed in table 1 were used in the form of aqueous solutions. These aqueous solutions of polyvinyl alcohol having concentrations between 8% and 21% by weight were prepared while observing the conditions familiar to those skilled in the art; more particularly, polyvinyl alcohols hydrolyzed to an extent of 88 mol % were dissolved at temperatures between 80 and 85° C. for at least 2 hours, and polyvinyl alcohols hydrolyzed to an extent of more than 80 mol % at temperatures between 90 and 95° C. for at least 2 hours. The solutions were subsequently cooled gradually to room temperature within 2 hours.

TABLE 2A

Substances and amounts for examples 1 to 32

| 1 Ex. no. | 2 Monomer | 3 F1 | 4 F2 | 5 Amount of initial charge grams | 6 Percentage by weight of initial charge based on final dispersion | 7 Temp. degrees C. |
|---|---|---|---|---|---|---|
| 1 | VAC | NaPS | Na-iAsc | 300 | 29 | 50 |
| 2 | VAC | NaPS | Na-iAsc | 300 | 20 | 50 |
| 3 | VAC | NaPS | Na-iAsc | 366 | 20 | 50 |
| 4 | VAC | H2O2 | Na-iAsc | 366 | 20 | 50 |
| 5 | VAC | tBHP | Na-iAsc | 366 | 20 | 50 |
| 6 | VAC | H2O2 | Na-iAsc | 334 | 19 | 50 |
| 7 | VAC | tBHP | Na-iAsc | 334 | 19 | 50 |
| 8 | VAC | tBHP | Na-iAsc | 318 | 18 | 50 |
| 9 | VAC | NaPS | Na-iAsc | 302 | 17 | 50 |
| 10 | VAC | tBHP | Na-iAsc | 300 | 17 | 50 |
| 11 | VAC | tBHP | Na-iAsc | 302 | 17 | 50 |
| 12 | VAC | tBHP | Na-iAsc | 302 | 14 | 50 |
| 13 | VAC | tBHP | Na-iAsc | 302 | 17 | 50 |
| 14 | VAC | tBHP | Na-iAsc | 300 | 17 | 50 |
| 15 | VAC | NaPS | Na-iAsc | 366 | 20 | 50 |
| 16 | VAC | NaPS | Na-iAsc | 366 | 20 | 50 |
| 17 | VAC | NaPS | Na-iAsc | 366 | 20 | 50 |
| 18 | VAC | NaPS | Na-iAsc | 480 | 27 | 50 |
| 19 | VAC | NaPS | Na-iAsc | 252 | 14 | 50 |
| 20 | VAC | H2O2 | tart. a. | 333 | 20 | 70 |
| 21 | VAC | NaPS | Na-iAsc | 333 | 19 | 70 |
| 22 | VAC | tBHP | Na-iAsc | 302 | 14 | 50 |
| 23 | VAC | tBHP | Na-iAsc | 302 | 14 | 50 |
| 24 | VAC | H2O2 | tart. a. | 308 | 17 | 83 |
| 25 | VAC | H2O2 | tart. a. | 302 | 17 | 83 |
| 26 | VAC/Eth | tBHP | AscSr | 94.440 | 17 | 70 |
| 27 | VAC/VL/Eth | tBHP | AscSr | 3.450 | 20 | 70 |
| 28 | VAC/VL | NaPS | Na-iAsc | 334 | 20 | 50 |
| 29 | VAC/BA | NaPS | Na-iAsc | 302 | 17 | 50 |
| 30 | VAC/VeoVa9 | H2O2 | tart. a. | 308 | 16 | 83 |
| 31 | VAC/VeoVa9/NMA | H2O2 | tart. a. | 308 | 16 | 83 |
| 32 | VAC/VeoVa9/NMA | H2O2 | tart. a. | 308 | 16 | 83 |

Table 2 lists the raw materials used, i.e. the monomers (with the abbreviations just mentioned), the oxidizing agents (feed 1) and the reducing agents (feed 2). Table 2 also lists: the amount of aqueous initial charge in grams and the proportion thereof in % by weight of the total weight of all the raw materials used, and the polymerization temperature.

TABLE 2B

Substances and amounts for comparative examples C1 to C7 and use example UE

| 1 Ex. no. | 2 Monomer | 3 F1 | 4 F2 | 5 Amount of initial charge grams | 6 Percentage of initial charge based on final dispersion | 7 Temp. degrees C. |
|---|---|---|---|---|---|---|
| C1 | VAC | H2O2 | none | 1.059 | 49 | 83 |
| C2 | VAC/NMA | H2O2 | none | 1.116 | 51 | 83 |
| C3 | VAC/VeoVa9/NMA | H2O2 | tart. a. | 1.055 | 54 | 83 |
| C4 | VAC | H2O2 | none | 1.116 | 51 | 83 |
| C5 | VAC/NMA | H2O2 | none | 1.116 | 51 | 83 |
| C6 | VAC | tBHP | Na-iAsc | 578 | 32 | 50 |
| C7 | Styrene/BA | tBHP | SFS | 300 | 17 | 80 |
| UE | VAC | tBHP | Na-iAsc | 255 | 10 | 50 |

Legend for Tables 2A and 2B
Column 1: number of examples 1 to 32; or of comparative examples C1 to C7; UE stands for use example
Column 2: monomers used
Column 3: oxidizing agent in feed 1 (F1)
Column 4: reducing agent in feed 2 (F2)
Column 5: amount of the aqueous initial charge, comprising polyvinyl alcohol in concentration (C), in grams
Column 6: proportion by weight of the aqueous initial charge based on the total weight of all the raw materials used in the process, i.e. based on the weight of the dispersion, in % by weight Column 7: polymerization temperature in degrees Celsius

4. Inventive Examples

Example 1

300 grams of an aqueous mixture containing 85.1 gram per liter of water of type A polyvinyl alcohol and 0.07 gram per liter of ferric ammonium sulfate were initially charged in the reactor. At target temperature 50° C., feeds 1 and 2 were started. Feed 1 was a 4.5% by weight aqueous solution of sodium persulfate; feed 2 was a 3.5% by weight aqueous solution of sodium isoascorbate. Feed 3 consisted of 298 grams of vinyl acetate and was metered in completely within 66 minutes. Feed 4 consisted of 353 grams of water and 32 grams of a 20% by weight aqueous solution of type A polyvinyl alcohol and was metered in within the same period of 66 minutes. Feeds 1 and 2 were ended after 35 ml each of feed 1 and feed 2 had been added to the reactor.

Example 2

As example 1, except that feed 3 consisted of 614 grams of vinyl acetate and was metered in completely within 136 minutes, and feed 4 consisted of 236 grams of water and 230 grams of a 20% by weight aqueous solution of type A polyvinyl alcohol and was metered in within the same period of 136 minutes. Feeds 1 and 2 were ended after 55 ml each of feed 1 and feed 2 had been added to the reactor.

Example 3

As example 1, except that 366 grams of an aqueous mixture containing 36.2 grams per liter of water of type A polyvinyl alcohol and 0.06 gram per liter of ferric ammonium sulfate were initially charged in the reactor; feed 3 consisted of 814 grams of vinyl acetate and was metered in completely at constant rate within 180 minutes; feed 4 consisted of 95 grams of water and 347 grams of a 20% by weight aqueous solution of type A polyvinyl alcohol and was metered in within the same period of 180 minutes. Feeds 1 and 2 were ended after 83 ml each of feed 1 and feed 2 had been added to the reactor.

Example 4

As example 3; feed 1 was a 2.0% by weight aqueous solution of hydrogen peroxide. Feeds 1 and 2 were ended after 83 ml each of feed 1 and feed 2 had been added to the reactor.

Example 5

As example 3, except that feed 1 was a 1.7% by weight aqueous solution of t-butyl hydroperoxide. Feeds 1 and 2 were ended after 83 ml each of feed 1 and feed 2 had been added to the reactor.

Example 6

As example 3, except that 334 grams of an aqueous mixture containing 19.5 grams per liter of water of type A polyvinyl alcohol were initially charged in the reactor; feed 1 was a 2.0% by weight aqueous solution of hydrogen peroxide and feed 4 consisted of 95 grams of water and 379 grams of a 20% by weight aqueous solution of type A polyvinyl alcohol. Feeds 1 and 2 were ended after 87 ml each of feed 1 and feed 2 had been added to the reactor.

Example 7

As example 6, except that feed 1 was a 1.7% by weight aqueous solution of t-butyl hydroperoxide. Feeds 1 and 2 were ended after 80 ml each of feed 1 and feed 2 had been added to the reactor.

Example 8

As example 7, except that 318 grams of an aqueous mixture containing 10.2 grams per liter of water of type A polyvinyl alcohol were initially charged in the reactor, and feed 4 consisted of 95 grams of water and 395 grams of a 20% by weight aqueous solution of type A polyvinyl alcohol. Feeds 1 and 2 were ended after 79 ml each of feed 1 and feed 2 had been added to the reactor.

Example 9

The procedure was as for example 3, except that 302 grams of an aqueous mixture containing 0.06 gram per liter of ferric ammonium sulfate were initially charged in the reactor; simultaneously with feed 3, feed 4 consisting of 95 grams of water and 411 grams of a 20% by weight aqueous solution of type A polyvinyl alcohol was started at a feed rate of 334.6 grams per hour. 15 minutes later, the addition rate was reduced and the remaining amount of feed 4 was metered in at constant rate over a period of 165 minutes. Feeds 1 and 2 were ended after 81 ml each of feed 1 and feed 2 had been added to the reactor.

Example 10

300 grams of an aqueous mixture containing 5.0 grams per liter of water of type A polyvinyl alcohol and 0.06 gram per liter of ferric ammonium sulfate were initially charged in the reactor. At target temperature 50° C., feeds 1 and 2 were started at a rate of 20 ml/h; this rate was not changed subsequently. Feed 1 was a 1.7% by weight aqueous solution of t-butyl hydroperoxide; feed 2 was a 3.5% by weight aqueous solution of sodium isoascorbate. 5 minutes after the start of feeds 1 and 2, feed 3 consisting of 814 grams of vinyl acetate was started and the total amount was metered in completely at constant rate within 180 minutes. 5 minutes after starting feed 3, feed 4 consisting of 124 grams of water and 400 grams of a 20% by weight aqueous solution of type A polyvinyl alcohol was started, and the total amount of feed 4 was metered in homogeneously over a period of 175 minutes. Feeds 1 and 2 were ended after 66 ml each of feed 1 and feed 2 had been added to the reactor.

Example 11

As example 9, except that, 5 minutes after starting feed 3, feed 4 was started at a rate of 245.5 grams/h. 15 minutes later, this feed rate was reduced and the remaining amount of feed 4 was metered in homogeneously over a period of 165 minutes. Feeds 1 and 2 were ended after 82.5 ml each of feed 1 and feed 2 had been added to the reactor.

Example 12

302 grams of an aqueous mixture containing 0.06 gram per liter of ferric ammonium sulfate were initially charged in the reactor. At target temperature 50° C., feeds 1 and 2 were started at a rate of 20 ml/h; this rate was not changed subsequently. Feed 1 was a 1.7% by weight aqueous solution of t-butyl hydroperoxide; feed 2 was a 3.5% by weight aqueous solution of sodium isoascorbate. 5 minutes after the start of feeds 1 and 2, feed 3 consisting of 1254 grams of vinyl acetate was started and the total amount was metered in completely at constant rate within 180 minutes. Simultaneously with feed 3, feed 4 consisting of 95 grams of water and 411 grams of a 20% by weight aqueous solution of type A polyvinyl alcohol was started at a rate of 211.9 grams/h. 15 minutes later, this feed rate was reduced and the remaining amount of feed 4 was metered in homogeneously over a period of 165 minutes. Feeds 1 and 2 were ended after 80 ml each of feed 1 and feed 2 had been added to the reactor.

For the viscosity measurement according to point 1.2, spindle 6 was used.

Example 13

302 grams of an aqueous mixture containing 0.06 gram per liter of ferric ammonium sulfate were initially charged in the reactor. Feed 1 was a 1.7% by weight aqueous solution of t-butyl hydroperoxide; feed 2 was a 3.5% by weight aqueous solution of sodium isoascorbate. 5 minutes after the start of feeds 1 and 2, feed 3 consisting of 814 grams of vinyl acetate was started and the total amount was metered in completely at constant rate within 180 minutes. Simultaneously with feed 3, feed 4 consisting of 95 grams of water and 411 grams of a 20% by weight aqueous solution of type A polyvinyl alcohol was started at a rate of 147.7 grams/h. 15 minutes later, this feed rate was reduced and the remaining amount of feed 4 was metered in homogeneously over a period of 165 minutes. Feeds 1 and 2 were ended after 80 ml each of feed 1 and feed 2 had been added to the reactor.

Example 14

302 grams of an aqueous mixture containing 1.0 gram per liter of water of type A polyvinyl alcohol and 0.06 gram per liter of ferric ammonium sulfate were initially charged in the reactor. Feed 1 was a 1.7% by weight aqueous solution of t-butyl hydroperoxide; feed 2 was a 3.5% by weight aqueous solution of sodium isoascorbate. 5 minutes after the start of feeds 1 and 2, feed 3 consisting of 814 grams of vinyl acetate was started and the total amount was metered in completely at constant rate within 180 minutes. 5 minutes after the start of feed 3, feed 4 consisting of 118 grams of water and 406 grams of a 20% by weight aqueous solution of type A polyvinyl alcohol was started at a rate of 116 grams/h. 15 minutes later, this feed rate was reduced and the remaining amount of feed 4 was metered in homogeneously over a period of 150 minutes. Feeds 1 and 2 were ended after 66 ml each of feed 1 and feed 2 had been added to the reactor.

The mixture was adjusted to pH 4.5. For the viscosity measurement according to point 1.2, spindle 2 was used.

Example 15

366 grams of an aqueous mixture containing 36.2 grams per liter of water of type A polyvinyl alcohol and 0.06 gram per liter of ferric ammonium sulfate were initially charged in the reactor. Feed 1 was a 4.5% by weight aqueous solution of sodium persulfate; feed 2 was a 3.5% by weight aqueous solution of sodium isoascorbate. 5 minutes after the start of feeds 1 and 2, feed 3 consisting of 814 grams of vinyl acetate was started at a rate of 543 grams/h. 30 minutes later, this rate was reduced and the remaining amount of feed 3 was metered in completely at constant rate over a period of 150 minutes.

Simultaneously with the start of feed 3, feed 4 consisting of 95 grams of water and 347 grams of a 20% by weight aqueous solution of type A polyvinyl alcohol was started and the total amount was metered in homogeneously within 180 minutes. Feeds 1 and 2 were ended after 82.5 ml each of feed 1 and feed 2 had been added to the reactor.

For the viscosity measurement according to point 1.2, spindle 3 was used.

Example 16

The procedure was as for example 15, except that feed 3 consisting of 814 grams of vinyl acetate was started at a rate of 135.8 grams/h; 30 minutes later, this rate was increased and the remaining amount of feed 3 was metered in completely at constant rate over a period of 150 minutes. Simultaneously with the start of feed 3, feed 4 consisting of 95 grams of water and 347 grams of a 20% by weight aqueous solution of type A polyvinyl alcohol was started and the total amount was metered in homogeneously within 180 minutes. Feeds 1 and 2 were ended after 78 ml each of feed 1 and feed 2 had been added to the reactor.

For the viscosity measurement according to point 1.2, spindle 3 was used.

Example 17

366 grams of an aqueous mixture containing 36.2 grams per liter of water of type A polyvinyl alcohol and 0.06 gram per liter of ferric ammonium sulfate were initially charged in the reactor. At target temperature 50° C., feeds 1 and 2 were started at a rate of 40 ml/h; this rate was reduced to 18 ml/h after 35 minutes had elapsed. Feed 1 was a 4.5% by weight aqueous solution of sodium persulfate; feed 2 was a 3.5% by weight aqueous solution of sodium isoascorbate. 5 minutes after the start of feeds 1 and 2, feed 3 consisting of 814 grams of vinyl acetate was started and metered in completely at constant rate over a period of 180 minutes. Simultaneously with the start of feed 3, feed 4 consisting of 95 grams of water and 347 grams of a 20% by weight aqueous solution of type A polyvinyl alcohol was started and the total amount was metered in homogeneously within 180 minutes. Feeds 1 and 2 were ended after 87.5 ml each of feed 1 and feed 2 had been added to the reactor.

For the viscosity measurement according to point 1.2, spindle 3 was used.

Example 18

480 grams of an aqueous mixture containing 36.3 grams per liter of water of type A polyvinyl alcohol and 0.06 gram per liter of ferric ammonium sulfate were initially charged in the reactor. At target temperature 50° C., feeds 1 and 2 were started, each at a rate of 20 ml/h; this rate was not changed again subsequently. Feed 1 was a 4.5% by weight aqueous solution of sodium persulfate; feed 2 was a 3.5% by weight aqueous solution of sodium isoascorbate. 5 minutes after the start of feeds 1 and 2, feed 3 consisting of 814 grams of vinyl acetate was started and metered in completely at constant rate over a period of 180 minutes. Simultaneously with the start of feed 3, feed 4 consisting of 329.5 grams of a 20% by weight aqueous solution of type A polyvinyl alcohol was started and the total amount was metered in homogeneously within 180 minutes. Feeds 1 and 2 were ended after 86 ml each of feed 1 and feed 2 had been added to the reactor.

For the viscosity measurement according to point 1.2, spindle 3 was used.

Example 19

The procedure was as for example 18, except that 252 grams of an aqueous solution containing 36.2 grams per liter of water of type A polyvinyl alcohol were initially charged in the reactor, and feed 4 consisted of 197 grams of water and 347 grams of a 20% by weight aqueous solution of type A polyvinyl alcohol. Feeds 1 and 2 were ended after 82 ml each of feed 1 and feed 2 had been added to the reactor. For the viscosity measurement according to point 1.2, spindle 3 was used.

Example 20

333 grams of an aqueous mixture containing 19.6 grams per liter of water of type A polyvinyl alcohol and 0.06 gram per liter of ferric ammonium sulfate were initially charged in the reactor. At target temperature 70° C., feeds 1 and 2 were started at a rate of 20 ml/h; this rate was not changed subsequently. Feed 1 was a 2.0% by weight aqueous solution of hydrogen peroxide; feed 2 was a 3.5% by weight aqueous solution of tartaric acid. Feed 3 consisted of 814 grams of vinyl acetate and feed 4 consisted of 236 grams of water and 189 grams of a 20% by weight aqueous solution of type A polyvinyl alcohol. Feed 2 was ended 25 minutes after feeds 3 and 4 had been ended. Feed 1 was ended 45 minutes later. 69 ml of feed 2 and 84 ml of feed 1 were consumed.

For the viscosity measurement according to point 1.2, spindle 3 was used.

Example 21

The procedure was as for example 20, except that feed 1 was a 4.5% by weight aqueous solution of sodium persulfate; feed 2 was a 3.5% by weight aqueous solution of sodium isoascorbate and feed 4 consisted of 240 grams of water and 189 grams of a 20% by weight aqueous solution of type A polyvinyl alcohol. Feeds 1 and 2 were ended after 71 ml each of feed 1 and feed 2 had been added to the reactor.

Example 22

302 grams of an aqueous mixture containing 10.0 grams per liter of water of type D polyvinyl alcohol and 0.06 gram per liter of ferric ammonium sulfate were initially, charged in the reactor. Feed 1 was a 1.7% by weight aqueous solution of t-butyl hydroperoxide; feed 2 was a 3.5% by weight aqueous solution of sodium isoascorbate. Feed 3 consisted of 972 grams of vinyl acetate. 5 minutes after the start of feed 3, feed 4 consisting of 675 grams of a 10% by weight aqueous solution of type D polyvinyl alcohol was started and the total amount was metered in homogeneously within 175 minutes. Feeds 1 and 2 were ended after 70 ml each of feed 1 and feed 2 had been added to the reactor.

Example 23

The procedure was as for example 22, except that type E polyvinyl alcohol was used in the aqueous mixture for the initial charge and for feed 4, and feed 3 consisted of 975 grams of vinyl acetate. Feeds 1 and 2 were ended after 72 ml each of feed 1 and feed 2 had been added to the reactor.

For the viscosity measurement according to point 1.2, spindle 3 was used.

Example 24

308 grams of an aqueous mixture adjusted to the pH of 4.8 and containing 5.1 grams per liter of water of type G polyvinyl alcohol and 2.5 grams of a 20% by weight aqueous tartaric acid solution were initially charged in the reactor. The mixture was heated to target temperature 83° C. and, during the heating, at 55° C., feeds 1 and 2 were started at a rate of 20 ml/h; this rate was not changed subsequently. Feed 1 was a 2.0% by weight aqueous solution of hydrogen peroxide; feed 2 was a 3.5% by weight aqueous solution of tartaric acid. 5 minutes after the start of feeds 1 and 2, feed 3 consisting of 814 grams of vinyl acetate was started and metered in completely at constant rate over a period of 180 minutes. 5 minutes after the start of feed 3, feed 4 consisting of 540 grams of an 11% by weight aqueous solution of type G polyvinyl alcohol was started and the total amount was metered in homogeneously within 175 minutes. Feed 2 was ended 35 minutes after the end of feeds 3 and 4. Feed 1 was ended a further 35 minutes later. 75 ml of feed 2 and 84.5 ml of feed 1 were consumed. For the viscosity measurement according to point 1.2, spindle 3 was used.

The dispersion produced in this example was formulated to a wood glue. For this purpose, 2 parts of an emulsion composed of propylene carbonate and 10% by weight aqueous solution of type A polyvinyl alcohol, in a weight ratio of 2:1, were stirred into 100 parts of dispersion. In accordance with DIN EN 204/205, the water resistance of the oak wood adhesive bond produced by means of the formulation was determined. The D3/3 water resistance was determined as 3 N/mm$^2$. Thus, product according to example 24 can be used to produce a water-resistant wood glue that meets the water resistance demands of D3 stress group, without needing to use a postcrosslinker monomer and/or acidic catalysts therefore.

Example 25

308 grams of an aqueous mixture adjusted to the pH of 4.8 and containing 10 grams per liter of water of types I/J/G/R polyvinyl alcohol in a weight ratio of 20/30/30/20 and 2.5 grams of a 20% by weight aqueous tartaric acid solution were initially charged in the reactor. The mixture was heated to target temperature 83° C. and, during the heating, at 55° C., feeds 1 and 2 were started at a rate of 20 ml/h; this rate was not changed subsequently. Feed 1 was a 2.0% by weight aqueous solution of hydrogen peroxide; feed 2 was a 3.5% by weight aqueous solution of tartaric acid. Feed 3 consisted of 814 grams of vinyl acetate and feed 4 consisting of 540 grams of a 11% by weight aqueous solution of types I/J/G/R polyvinyl alcohol in a weight ratio of 20/30/30/20 was started 5 minutes after feed 3 and the total amount was metered in homogeneously within 175 minutes. Feed 2 was ended 35 minutes after the end of feeds 3 and 4. Feed 1 was ended a further 35 minutes later. 75 ml of feed 2 and 84.5 ml of feed 1 were consumed. For the viscosity measurement according to point 1.2, spindle 3 was used.

Example 26

94.445 kg of an aqueous mixture adjusted to the pH of 3.8 and containing 32.9 grams per liter of water of type A polyvinyl alcohol and 0.06 gram per liter of ferric ammonium sulfate were initially charged in the reactor and at a speed of 200 rpm, which was constant over the entire procedure, 10 kg of ethylene were injected and the mixture was heated to target temperature 70° C. At target temperature, feeds 1 and 2 were started at a rate of 20 kg/h; this rate was kept constant for 245 minutes. Feed 1 was a 5.0% by weight aqueous solution of t-butyl hydroperoxide; feed 2 was a 5.0% by weight aqueous solution of ascorbic acid. 5 minutes after the start of feeds 1 and 2, feed 3 consisting of 244.4 kg of vinyl acetate, was started and metered in completely at constant rate over a period of 240 minutes.

Simultaneously with feed 3, feed 4 consisting of 64.76 kg of water and 129.52 kg of a 20% by weight aqueous solution of type A polyvinyl alcohol was started and the total amount was metered in homogeneously within 240 minutes. Within the period of metered addition of feeds 3 and 4, a total amount of 10 kg of ethylene was also metered in at constant pressure of 15 bar. After the end of feeds 3 and 4, the metering rates of feeds 1 and 2 were increased and metered addition was continued for a period of 55 minutes. 75 kg each of feeds 1 and 2 were consumed.

The mixture was adjusted to a pH of 5. For the viscosity measurement according to point 1.2, spindle 4 was used.

Example 27

3.45 kg of an aqueous mixture adjusted to the pH of 3.8 and containing 54.1 grams per liter of water of type A polyvinyl alcohol and 0.06 gram per liter of ferric ammonium sulfate were initially charged in the reactor and, at a speed of 350 rpm, which was constant over the entire procedure, 175 grams of ethylene were injected and the mixture was heated to target temperature 70° C. At target temperature, feeds 1 and 2 were started at a rate of 31.6 grams/h; this rate was subsequently kept constant. Feed 1 was a 5.0% by weight aqueous solution of t-butyl hydroperoxide; feed 2 was a 5.0% by weight aqueous solution of ascorbic acid. 5 minutes after the start of feeds 1 and 2, feed 3 consisting of 3.33 kg of vinyl acetate and 3.33 kg of vinyl laurate was started and metered in completely at constant rate over a period of 240 minutes. Simultaneously with feed 3, feed 4 consisting of 1.6 kg of water, 2.17 kg of a 20% by weight aqueous solution of type A polyvinyl alcohol and 1.0 kg of a 20% by weight aqueous solution of type F polyvinyl alcohol was started and the total amount was metered in homogeneously within 240 minutes. Within the period of metered addition of feeds 3 and 4, at a pressure between 8 and 10 bar, a total of 160 grams of ethylene was also metered in. Feeds 1 and 2 were ended 335 minutes after they had started.

The mixture was adjusted to a pH of 5. For the viscosity measurement according to point 1.2, spindle 4 was used.

Example 28

334 grams of an aqueous mixture containing 19.5 grams per liter of water of type A polyvinyl alcohol and 0.06 gram per liter of ferric ammonium sulfate were initially charged in the reactor. Feed 1 was a 4.5% by weight aqueous solution of sodium persulfate; feed 2 was a 3.5% by weight aqueous solution of sodium isoascorbate. 5 minutes after the start of feeds 1 and 2, feed 3 consisting of 136 grams of vinyl acetate was started and metered in completely at constant rate over a period of 30 minutes. Simultaneously with the start of feed 3, feed 4 consisting of 230 grams of water and 140 grams of a 20% by weight aqueous solution of type A polyvinyl alcohol was started and the total amount was metered in homogeneously within 180 minutes. As soon as feed 3 had ended, a feed 3.1 consisting of 496 grams of vinyl acetate and 83 grams of vinyl laurate was started and metered in completely at constant rate over a period of 128 minutes. As soon as feed 3.1 had ended, a feed 3.2 consisting of 100 grams of vinyl acetate was started and metered in completely at constant rate over a period of 22 minutes. Feeds 1 and 2 were ended after 81 ml each of feed 1 and feed 2 had been added to the reactor.

Example 29

302 grams of an aqueous mixture containing 10.0 grams per liter of water of type A polyvinyl alcohol and 0.06 gram per liter of ferric ammonium sulfate were initially charged in the reactor. Feed 1 was a 4.5% by weight aqueous solution of sodium persulfate; feed 2 was a 3.5% by weight aqueous solution of sodium isoascorbate. 5 minutes after the start of feeds 1 and 2, feed 3 consisting of 181 grams of vinyl acetate was started and metered in completely at constant rate over a period of 40 minutes. 5 minutes after the start of feed 3, feed 4 consisting of 132 grams of water and 392 grams of a 20% by weight aqueous solution of type A polyvinyl alcohol was started and the total amount was metered in homogeneously within 175 minutes. As soon as feed 3 had ended, a feed 3.1 consisting of 470 grams of vinyl acetate and 163 grams of butyl acrylate was started and metered in completely at constant rate over a period of 140 minutes. Feeds 1 and 2 were ended after 77 ml each of feed 1 and feed 2 had been added to the reactor.

Example 30

308 grams of an aqueous mixture adjusted to the pH of 4.8 and containing 8.0 grams per liter of water of type G polyvinyl alcohol and 2.5 grams of a 20% by weight aqueous tartaric acid solution were initially charged in the reactor. The mixture was heated to target temperature 83° C. and, during the heating, at 55° C., feeds 1 and 2 were started at a rate of 20 ml/h; this rate was not changed subsequently. Feed 1 was a 2.0% by weight aqueous solution of hydrogen peroxide; feed 2 was a 3.5% by weight aqueous solution of tartaric acid. 5 minutes after the start of feeds 1 and 2, feed 3 consisting of 692 grams of vinyl acetate and 122 grams of VeoVa® 9 was started and metered in completely at constant rate over a period of 180 minutes. 5 minutes after the start of feed 3, feed 4 consisting of 645 grams of an 11% by weight aqueous solution of type G polyvinyl alcohol was started and the total amount was metered in homogeneously within 175 minutes. Feed 2 was ended 35 minutes after the end of feeds 3 and 4. Feed 1 was ended a further 30 minutes later. 71 ml of feed 2 and 80.5 ml of feed 1 were consumed.

For the viscosity measurement according to point 1.2, spindle 3 was used.

Example 31

308 grams of an aqueous mixture adjusted to the pH of 4.8 and containing 8.0 grams per liter of water of type G polyvinyl alcohol and 2.5 grams of a 20% by weight aqueous tartaric acid solution were initially charged in the reactor. The mixture was heated to target temperature 83° C. and, during the heating, at 55° C., feeds 1 and 2 were started at a rate of 20 ml/h; this rate was not changed subsequently. Feed 1 was a 2.0% by weight aqueous solution of hydrogen peroxide; feed 2 was a 3.5% by weight aqueous solution of tartaric acid. 5 minutes after the start of feeds 1 and 2, feed 3 consisting of 692 grams of vinyl acetate and 122 grams of VeoVa® 9 was started and metered in completely at constant rate over a period of 180 minutes. 5 minutes after the start of feed 3, feed 4 consisting of 645 grams of an 11% by weight aqueous solution of type G polyvinyl alcohol and 13 grams of a 48% by weight aqueous solution of N-methylolacrylamide was started and the total amount was metered in homogeneously within 175 minutes. Feed 2 was ended 25 minutes after the end of feeds 3 and 4. Feed 1 was ended a further 20 minutes later. 71 ml of feed 2 and 79 ml of feed 1 were consumed.

For the viscosity measurement according to point 1.2, spindle 4 was used.

Example 32

308 grams of an aqueous mixture adjusted to the pH of 5.5 and containing 12.0 grams per liter of water of type G polyvinyl alcohol and 2.5 grams of a 20% by weight aqueous tartaric acid solution were initially charged in the reactor. The mixture was heated to target temperature 83° C. and, during the heating, at 55° C., feeds 1 and 2 were started at a rate of 20 ml/h; this rate was not changed subsequently. Feed 1 was a 2.0% by weight aqueous solution of hydrogen peroxide; feed 2 was a 3.5% by weight aqueous solution of tartaric acid. 5 minutes after the start of feeds 1 and 2, feed 3 consisting of 181 grams of vinyl acetate was started and metered in completely at constant rate over a period of 40 minutes. 5 minutes after the start of feed 3, feed 4 consisting of 150 grams of an 11% by weight aqueous solution of type G polyvinyl alcohol was started and the total amount was metered in homogeneously within 40 minutes. As soon as feed 3 had ended, a feed 3.1 consisting of 511 grams of vinyl acetate and 122 grams of VeoVa® 9 was started and metered in completely at constant rate over a period of 140 minutes. Simultaneously with the start of feed 3.1, a feed 4.1 consisting of 494.6 grams of an 11% by weight aqueous solution of type G polyvinyl alcohol and 13 grams of a 48% by weight aqueous solution of N-methylolacrylamide was started and the total amount was metered in homogeneously within 140 minutes. With the end of feeds 3.1 and 4.1, feed 2 was ended. Feed 1 was ended a further 37 minutes later. 60 ml of feed 2 and 70 ml of feed 1 were consumed. For the viscosity measurement according to point 1.2, spindle 4 was used.

The dispersion produced in this example was formulated to a wood glue. For this purpose, 3 parts of an emulsion composed of propylene carbonate and 10% by weight aqueous solution of type A polyvinyl alcohol, in a weight ratio of 2:1, and 5 parts of a 50% by weight aqueous solution of aluminum chloride were stirred into 100 parts of dispersion. In accordance with DIN EN 204/205, the water resistance of the oak wood adhesive bond produced by means of the formulation was determined. The D3/3 water resistance was determined as 6.3 N/mm$^2$, and the D4/5 water resistance was determined as 4.1 N/mm$^2$. Thus, product according to example 32 can be used to produce a water-resistant wood glue that meets the water resistance demands of D4 stress group.

6. Comparative Examples

Comparative Example C1

959 grams of an aqueous solution containing 85.1 grams per liter of water of type B polyvinyl alcohol and 8.5 grams of a 20% by weight aqueous tartaric acid solution, and 100 grams of vinyl acetate were initially charged in the reactor. While heating to 60° C., at 50° C., feed 1 was started at a rate of 20 ml/h. Feed 1 was a 2.0% by weight aqueous solution of hydrogen peroxide. No feed 2 was used. Immediately after the temperature maximum that occurred as a result of the exothermic reaction had been exceeded, the target temperature was increased to 83° C., the rate of feed 1 was reduced to 10 ml/h and feed 3 consisting of 900 grams of vinyl acetate was started and metered in completely at constant rate within 150 minutes. Simultaneously with feed 3, feed 4 consisting exclusively of 100 grams of water was started and the total amount was metered in homogeneously over a period of 150 minutes. After feeds 3 and 4 had ended, the rate of feed 1 was increased stepwise to 50 ml/h. Feed 1 was ended after 75 ml had been added to the reactor. Subsequently, further polymerization was accomplished by twice adding 1 gram each of 10% by weight solutions of t-butyl hydroperoxide and of sodium isoascorbate in alternation, observing a wait time of 2 to 3 minutes between the additions.

The pH was not altered. For the viscosity measurement according to point 1.2, spindle 5 was used.

Comparative Example C2

1016 grams of an aqueous solution adjusted to the pH of 4.8, containing 8.5 grams of a 20% by weight aqueous tartaric acid solution and 85.1 grams per liter of water of types H and J polyvinyl alcohols (introduced into said aqueous solution as 300 grams of a 10% by weight solution of type H and 700 grams of a 10% by weight aqueous solution of type J), and 100 grams of vinyl acetate were initially charged in the reactor. While heating to 60° C., at 50° C., feed 1 was started at a rate of 20 ml/h. Feed 1 was a 2.0% by weight aqueous solution of hydrogen peroxide. No feed 2 was used. Immediately after the temperature maximum that occurred as a result of the exothermic reaction had been exceeded, the target temperature was increased to 83° C., the rate of feed 1 was reduced to 10 ml/h and feed 3 consisting of 894 grams of vinyl acetate was started and metered in completely at constant rate within 150 minutes. Simultaneously with feed 3, feed 4 consisting of 83.4 grams of water and 16.6 grams of a 48% by weight N-methylolacrylamide solution was started and the total amount was metered in homogeneously over a period of 150 minutes. After feeds 3 and 4 had ended, the rate of feed 1 was increased stepwise to 50 ml/h. Feed 1 was ended after 75 ml had been added to the reactor.

Subsequently, further polymerization was accomplished by twice adding 1 gram each of 10% by weight solutions of t-butyl hydroperoxide and of sodium isoascorbate in alternation, observing a wait time of 2 to 3 minutes between the additions.

The pH was adjusted to a value of 5.1. For the viscosity measurement according to point 1.2, spindle 5 was used.

Comparative Example C3

851 grams of an aqueous solution adjusted to the pH of 4, containing 0.8 gram of sodium acetate, 2.5 grams of a 20% by weight aqueous tartaric acid solution and 94.5 grams per liter of water of type G polyvinyl alcohol, and 204 grams of vinyl acetate were initially charged in the reactor. While heating to 60° C., at 50° C., feeds 1 and 2 were started at a rate of 15 ml/h. Feed 1 was a 2.0% by weight solution of hydrogen peroxide. Feed 2 was a 3.5% by weight aqueous tartaric acid solution. When the temperature started to rise as a result of the exothermic reaction, the rates of feeds 1 and 2 were reduced, in order to control the temperature rise. Immediately after the temperature maximum that occurred had been exceeded, the target temperature was increased to 83° C. and feed 3 consisting of 488 grams of vinyl acetate and 122 grams of VeoVa® 9 was started and metered in completely at constant rate within 180 minutes. The feed rates of feeds 1 and 2 were again increased to 18 ml/h. 5 minutes after the start of feed 3, feed 4 consisting of 100 grams of water and 13 grams of a 48% by weight N-methylolacrylamide solution was started and the total amount was metered in homogeneously over a period of 175 minutes. After feeds 3 and 4 had ended, the rates of feeds 1 and 2 were increased stepwise to 50 ml/h. Both feeds were ended after 80 ml of each had been added to the reactor. Subsequently, further polymerization was accomplished by twice adding 1 gram each of 10% by weight solutions of t-butyl hydroperoxide and of sodium isoascorbate in alternation, observing a wait time of 2 to 3 minutes between the additions.

The pH was adjusted to a value of 5. For the viscosity measurement according to point 1.2, spindle 5 was used.

Comparative Example C4

1016 grams of an aqueous solution adjusted to the pH of 4.8, containing 8.5 grams of a 20% by weight aqueous tartaric acid solution and 109.5 grams per liter of water of type E polyvinyl alcohol, and 100 grams of vinyl acetate were initially charged in the reactor. While heating to 60° C., at 50° C., feed 1 was started at a rate of 20 ml/h. Feed 1 was a 2.0% by weight aqueous solution of hydrogen peroxide. No feed 2 was used. Immediately after the temperature maximum that occurred as a result of the exothermic reaction had been exceeded, the target temperature was increased to 83° C., the rate of feed 1 was reduced to 10 ml/h and feed 3 consisting of 894 grams of vinyl acetate was started and metered in completely at constant rate within 150 minutes. Simultaneously with the start of feed 3, feed 4 consisting exclusively of 100 grams of water was started and the total amount was metered in homogeneously over a period of 150 minutes. After feeds 3 and 4 had ended, the rate of feed 1 was increased stepwise to 50 ml/h. Feed 1 was ended after 75 ml had been added to the reactor. Subsequently, further polymerization was accomplished by twice adding 1 gram each of 10% by weight solutions of t-butyl hydroperoxide and of sodium isoascorbate in alternation, observing a wait time of 2 to 3 minutes between the additions.

The pH was adjusted to a value of 5. For the viscosity measurement according to point 1.2, spindle 6 was used.

Comparative Example C5

1016 grams of an aqueous solution adjusted to the pH of 4.8, containing 8.5 grams of a 20% by weight aqueous tartaric acid solution and 109.5 grams per liter of water of type D polyvinyl alcohol, and 100 grams of vinyl acetate were initially charged in the reactor. While heating to 60° C., at 50° C., feed 1 was started at a rate of 20 ml/h. Feed 1 was a 2.0% by weight aqueous solution of hydrogen peroxide. No feed 2 was used. Immediately after the temperature maximum that occurred as a result of the exothermic reaction had been exceeded, the target temperature was increased to 83° C., the rate of feed 1 was reduced to 10 ml/h and feed 3 consisting of 894 grams of vinyl acetate was started and metered in completely at constant rate within 150 minutes. Simultaneously with the start of feed 3, feed 4 consisting of 87.5 grams of water and 12.5 grams of a 48% by weight N-methylolacrylamide solution was started and the total amount was metered in homogeneously over a period of 150 minutes. After feeds 3 and 4 had ended, the rate of feed 1 was increased stepwise to 50 ml/h. Feed 1 was ended after 75 ml had been added to the reactor.

Subsequently, further polymerization was accomplished by twice adding 1 gram each of 10% by weight solutions of t-butyl hydroperoxide and of sodium isoascorbate in alternation, observing a wait time of 2 to 3 minutes between the additions.

The pH was adjusted to a value of 5. For the viscosity measurement according to point 1.2, spindle 6 was used.

Comparative Example C6

334 grams of an aqueous solution containing 19.5 grams per liter of water of type A polyvinyl alcohol, and 224 grams of vinyl acetate were initially charged in the reactor. At target temperature 50° C., feeds 1 and 2 were started at a rate of 5 ml/h.

Feed 1 was a 1.7% by weight aqueous solution of t-butyl hydroperoxide; feed 2 was a 3.5% by weight aqueous solution of sodium isoascorbate. 5 minutes after the start of feeds 1 and 2, feed 3 consisting of 570 grams of vinyl acetate was started and metered in completely at constant rate within 180 minutes. Simultaneously with the start of feed 3, feed 4 consisting of 95 grams of water and 379 grams of a 20% by weight aqueous solution of type A polyvinyl alcohol was started and the total amount was metered in homogeneously over a period of 180 minutes. After feeds 3 and 4 had started, the rates of feeds 1 and 2 were regulated for a period of 60 minutes such that the internal temperature did not exceed a value of 60° C. Subsequently, the rates of both feeds were adjusted to 20 ml/h and remained unchanged over the rest of the procedure. Feeds 1 and 2 were ended after 57 ml each of feed 1 and feed 2 had been added to the reactor.

The pH was adjusted to a value of 4.5. For the viscosity measurement according to point 1.2, spindle 2 was used.

Comparative Example C7

300 grams of an aqueous solution containing 0.06 gram per liter of ferric ammonium sulfate were initially charged in the reactor and heated to 80° C. During the course of heating, at 70° C., feeds 1 and 2 were started at a rate of 20 ml/h; this rate was not changed subsequently. Feed 1 was a 2.55% by weight aqueous solution of t-butyl hydroperoxide; feed 2 was a 4.35% by weight aqueous solution of sodium formaldehydesulfoxylate. 5 minutes after the start of feeds 1 and 2, feed 3 consisting of 407 grams of styrene and 407 grams of butyl acrylate was started and metered in completely at constant rate over a period of 180 minutes. 5 minutes after the start of feed 3, feed 4 consisting of 100 grams of water, 244.5 grams of a 20% by weight aqueous solution of type A polyvinyl alcohol and 163 grams of a 20% by weight aqueous solution of type F polyvinyl alcohol was started and the total amount was metered in homogeneously within 175 minutes. After the end of feeds 3 and 4, the temperature was increased to 85° C. Even after further addition of feeds 1 and 2 over a period of well over 2 hours, complete monomer conversion was unattainable. Feeds 1 and 2 were ended after 130 ml each of feed 1 and feed 2 had been added to the reactor.

No pH adjustment was undertaken. For the viscosity measurement according to point 1.2, spindle 2 was used.

8. Use Example UE

This use example describes the use of inventive process products in emulsion polymerization processes for production of high-solids dispersions:

255 grams of an aqueous solution containing 1 gram per liter of water of type A polyvinyl alcohol and 0.06 gram per liter of ferric ammonium sulfate were initially charged in the reactor. At target temperature 50° C., feeds 1 and 2 were started at a rate of 20 ml/h and metered in for a period of 125 minutes. Feed 1 was a 1.7% by weight aqueous solution of t-butyl hydroperoxide; feed 2 was a 3.5% by weight aqueous solution of sodium isoascorbate. 5 minutes after the start of feeds 1 and 2, feed 3 consisting of 725 grams of vinyl acetate was started and the total amount was metered in completely at constant rate within 120 minutes. 5 minutes after the start of feed 3, feed 4 consisting of 327.8 grams of a 20% by weight aqueous solution of type A polyvinyl alcohol and 34.5 grams of a 10% by weight aqueous solution of type D polyvinyl alcohol was started and the total amount was metered in homogeneously over a period of 115 minutes. 41 grams each of feeds 1 and 2 were consumed.

After the feeds had ended, 2972 grams of the dispersion produced in example 2, which had been admixed beforehand with 5 grams of vinyl acetate and stirred at room temperature for 2 hours, were added homogeneously within 10 minutes.

Subsequently, feeds 1.1 and 2.1 were each started at 18 ml/h; these rates were not changed subsequently. Feed 1.1 was a 4.5% by weight aqueous solution of sodium persulfate. Feed 2.1 was a 3.5% by weight solution of sodium isoascorbate which had been prepared in a 2% by weight solution of sodium hydroxide. Simultaneously with the starting of feeds 1.1 and 2.1, feed 3.1 consisting of 780 grams of vinyl acetate was started and the total amount was metered in completely at constant rate within 120 minutes. Simultaneously with the start of feed 3.1, feed 4.1 consisting of 60 grams of a 20% by weight aqueous solution of type A polyvinyl alcohol was started and the total amount was metered in homogeneously over a period of 120 minutes.

Feeds 1.1 and 2.1 were ended after 45 ml each of feed 1.1 and feed 2.1 had been added to the reactor.

The pH was not adjusted. For the viscosity measurement according to point 1.2, spindle 5 was used.

The particle size distribution obtained by means of the Beckmann Coulter LS13320 showed the bimodal particle size distribution desired for the use example for production of high-solids dispersions having solids contents of >60% by weight, with a small proportion of the smaller particle fractions of ≤25% by volume, preferably of ≤20% by volume and especially preferably of ≤15% by volume, based on the total volume of all particles, being desirable. Accordingly, a high polydispersity DP>1.6 desired for the use example was obtained.

9. Results

Tables 3A and 3B compile essential batch characteristics relating, for example, to the use of the protective colloid in the initial charge and the initial addition rate (VZ). Table 3A relates to examples 1 to 32; table 3B relates to comparative examples C1 to C7 and the use example UE.

Tables 4A, for examples 1 to 32, and 4B for comparative examples C1 to C7 and the use example UE, summarize essential data regarding the characterization of the dispersions (solids content, pH, viscosity Bf20, coagulate content COA and screen residue SR) and of the particles.

TABLE 3A

Protective colloid characteristics for examples 1 to 32

| 1 Ex. no. | 2 PVOH type | 3 % by wt. of PVOH per mon. | 4 PVOH conc. (C) g/l H2O | 5 F4 rate g/h | 6 F4 cPVOH % | 7 Rate (VZ) grams per (min*l) |
|---|---|---|---|---|---|---|
| 1 | A | 10.0 | 85.1 | 350.0 | 1.7 | 0.35 |
| 2 | A | 10.0 | 54.6 | 205.6 | 9.9 | 1.19 |
| 3 | A | 10.1 | 36.2 | 147.3 | 15.7 | 1.09 |
| 4 | A | 10.1 | 36.2 | 147.3 | 15.7 | 1.09 |
| 5 | A | 10.1 | 36.2 | 147.3 | 15.7 | 1.09 |
| 6 | A | 10.1 | 19.5 | 158.0 | 16.0 | 1.29 |
| 7 | A | 10.1 | 19.5 | 158.0 | 16.0 | 1.29 |
| 8 | A | 10.1 | 10.2 | 163.3 | 16.1 | 1.39 |
| 9 | A | 10.1 | 0.0 | 334.6 | 16.2 | 3.00 |
| 10 | A | 10.0 | 5.0 | 179.7 | 15.3 | 1.53 |
| 11 | A | 10.1 | 0.0 | 245.4 | 16.2 | 2.20 |
| 12 | A | 6.6 | 0.0 | 211.9 | 16.2 | 1.90 |
| 13 | A | 10.1 | 0.0 | 147.7 | 16.2 | 1.32 |
| 14 | A | 10.0 | 1.0 | 116.0 | 15.5 | 1.00 |
| 15 | A | 10.1 | 36.2 | 147.3 | 15.7 | 1.09 |
| 16 | A | 10.1 | 36.2 | 147.3 | 15.7 | 1.09 |
| 17 | A | 10.1 | 36.2 | 147.3 | 15.7 | 1.09 |
| 18 | A | 10.2 | 36.3 | 109.9 | 20.0 | 0.79 |
| 19 | A | 9.6 | 36.2 | 181.3 | 12.8 | 1.59 |
| 20 | A | 5.4 | 19.6 | 141.7 | 8.9 | 0.64 |
| 21 | A | 5.4 | 19.6 | 143.0 | 8.8 | 0.64 |
| 22 | D | 7.3 | 10.0 | 231.4 | 10.0 | 1.29 |
| 23 | E | 7.1 | 5.0 | 231.4 | 10.0 | 1.28 |
| 24 | G | 7.5 | 5.1 | 185.1 | 11.0 | 1.11 |
| 25 | I/J/G/R | 7.5 | 10.0 | 185.1 | 11.0 | 1.14 |
| 26 | A | 10.8 | 32.9 | 48.570 | 13.3 | 1.32 |
| 27 | A/F | 10.0 | 54.1 | 1.190 | 13.3 | 0.86 |
| 28 | A | 4.2 | 19.5 | 123.3 | 7.6 | 0.47 |
| 29 | A | 10.0 | 10.0 | 179.7 | 15.0 | 1.50 |
| 30 | G | 9.0 | 8.0 | 221.1 | 11.0 | 1.33 |
| 31 | G | 8.9 | 8.0 | 225.6 | 10.8 | 1.33 |
| 32 | G | 9.1 | 12.0 | 225.6 | 11.0 | 1.37 |

TABLE 3B

Protective colloid characteristics for comparative examples C1 to C7 and use example UE

| 1 Ex. no. | 2 PVOH type | 3 % PVOH per mon. | 4 PVOH conc. (C) g/l H2O | 5 F4 rate g/h | 6 F4 cPVOH % | 7 Rate (VZ) grams per (min*l) |
|---|---|---|---|---|---|---|
| C1 | G | 7.5 | 85.1 | 0.0 | 0.0 | 0.00 |
| C2 | J/H | 10.0 | 109.3 | 0.0 | 0.0 | 0.00 |
| C3 | G | 8.9 | 94.5 | 0.0 | 0.0 | 0.00 |
| C4 | E | 10.1 | 109.5 | 0.0 | 0.0 | 0.00 |
| C5 | D | 10.0 | 109.5 | 0.0 | 0.0 | 0.00 |
| C6 | A | 10.1 | 19.5 | 158.0 | 16.0 | 1.29 |
| C7 | A/F | 10.0 | 0.0 | 174.0 | 16.1 | 1.55 |
| UE | A/D | 5.8 | 1.0 | 198.0 | 19.0 | 2.36 |

Legend for Tables 3A and 3B:

Column 1: number of examples 1 to 32; or of comparative examples C1 to C7; UE stands for use example, Column 2: polyvinyl alcohol types (PVOH types) used in each case as per table 1, Column 3: proportion of polyvinyl alcohol (PVOH) in % by weight based on the total weight of the monomers (mon.), Column 4: concentration of the polyvinyl alcohol (PVOH) in water ($H_2O$) in the initial charge in grams per liter, Column 5: feed rate of feed 4, containing the polyvinyl alcohol metered in, in grams per hour, Column 6: concentration of the polyvinyl alcohol (cPVOH) in feed 4 in % by weight based on the weight of water in feed 4, Column 6: initial addition rate (VZ) in grams of polyvinyl alcohol per minute and liter of water in the initial charge.

TABLE 4A

Dispersion characteristics for examples 1 to 32

| 1 Ex. no. | 2 SC exp % | 3 pH | 4 Bf20 mPas | 5 COA %/M | 6 SR ppm | 7 Dn nm | 8 Dw nm | 9 D3, 50 nm | 10 PD |
|---|---|---|---|---|---|---|---|---|---|
| 1 | 31.2 | 4.5 | 56 | 0.05 | 82 | 113 | 125 | 123 | 1.11 |
| 2 | 45.6 | 5.2 | 1350 | 0.08 | 226 | 157 | 177 | 171 | 1.13 |
| 3 | 50.1 | 4.5 | 2655 | 0.06 | 98 | 206 | 231 | 228 | 1.12 |
| 4 | 50.2 | 4.9 | 1323 | 0.05 | 507 | 294 | 321 | 317 | 1.09 |
| 5 | 50.7 | 5.1 | 847 | 0.05 | 372 | 336 | 365 | 360 | 1.09 |
| 6 | 50.0 | 4.9 | 497 | 0.02 | 97 | 382 | 409 | 404 | 1.07 |
| 7 | 50.4 | 5.1 | 427 | 0.01 | 56 | 428 | 459 | 454 | 1.07 |
| 8 | 50.6 | 5.1 | 311 | 0.02 | 35 | 509 | 565 | 555 | 1.11 |
| 9 | 50.3 | 4.5 | 241 | 0.01 | 46 | 620 | 698 | 655 | 1.13 |
| 10 | 50.7 | 5.3 | 263 | 0.06 | 67 | 739 | 805 | 787 | 1.09 |
| 11 | 50.4 | 5.1 | 206 | 0.01 | 33 | 826 | 868 | 861 | 1.05 |
| 12 | 60.4 | 4.9 | 3750 | 0.01 | 178 | 1000 | 1095 | 1081 | 1.10 |
| 13 | 50.6 | 4.9 | 176 | 0.02 | 51 | 1184 | 1300 | 1293 | 1.10 |
| 14 | 50.4 | 5.2 | 171 | 0.06 | 86 | 1381 | 1510 | 1495 | 1.09 |
| 15 | 50.0 | 4.5 | 1675 | 0.06 | 177 | 260 | 287 | 283 | 1.10 |
| 16 | 50.4 | 4.5 | 1510 | 0.06 | 56 | 283 | 308 | 304 | 1.09 |
| 17 | 50.0 | 4.5 | 1275 | 0.02 | 32 | 288 | 313 | 309 | 1.09 |
| 18 | 49.0 | 4.5 | 1450 | 0.06 | 69 | 265 | 292 | 288 | 1.10 |
| 19 | 50.2 | 4.5 | 1100 | 0.06 | 66 | 306 | 331 | 327 | 1.08 |
| 20 | 48.3 | 4.5 | 336 | 0.06 | 617 | 357 | 382 | 378 | 1.07 |
| 21 | 49.3 | 4.5 | 812 | 0.06 | 141 | 322 | 344 | 339 | 1.07 |
| 22 | 50.1 | 5.0 | 920 | 0.05 | 97 | 555 | 614 | 585 | 1.11 |
| 23 | 50.2 | 4.8 | 2540 | 0.05 | 105 | 764 | 833 | 815 | 1.09 |
| 24 | 47.7 | 4.5 | 1315 | 0.10 | 502 | 1057 | 1217 | 1198 | 1.15 |
| 25 | 47.5 | 4.6 | 1150 | 0.18 | 730 | 948 | 1039 | 1025 | 1.10 |
| 26 | 52.0 | 5.0 | 3100 | 0.04 | 473 | 278 | 328 | 317 | 1.18 |
| 27 | 50.2 | 4.5 | 9200 | 0.08 | 622 | 123 | 160 | 156 | 1.30 |
| 28 | 48.6 | 4.5 | 458 | 0.06 | 481 | 335 | 358 | 355 | 1.07 |
| 29 | 49.7 | 4.5 | 469 | 0.01 | 62 | 387 | 413 | 408 | 1.07 |
| 30 | 46.0 | 4.5 | 1720 | 0.04 | 223 | 952 | 1230 | 1144 | 1.29 |
| 31 | 46.0 | 4.5 | 3250 | 0.03 | 128 | 935 | 1268 | 1162 | 1.36 |
| 32 | 46.8 | 4.5 | 3500 | 0.15 | 427 | 920 | 1149 | 1085 | 1.25 |

TABLE 4B

Dispersion characteristics for comparative examples C1 to C7 and use example UE

| 1 Ex. no. | 2 SC exp % | 3 pH | 4 Bf20 mPas | 5 COA %/M | 6 SR tot ppm | 7 Dn nm | 8 Dw nm | 9 D3, 50 nm | 10 PD |
|---|---|---|---|---|---|---|---|---|---|
| C1 | 50.2 | 4.9 | 4000 | 0.02 | 853 | 530 | 1262 | 1063 | 2.38 |
| C2 | 51.2 | 5.1 | 11500 | 0.02 | 191 | 443 | 840 | 733 | 1.90 |
| C3 | 46.0 | 5.0 | 13140 | 0.04 | 1056 | 271 | 2741 | 2675 | 10.11 |
| C4 | 50.4 | 5.0 | 31500 | 0.05 | 211 | 332 | 1480 | 1101 | 4.46 |
| C5 | 50.9 | 5.3 | 18400 | 0.05 | 74 | 317 | 1724 | 1336 | 5.44 |
| C6 | 51.8 | 5.1 | 872 | 0.52 | 283 | 386 | 486 | 414 | 1.26 |
| C7 | 47.7 | 5.7 | 829 | 0.10 | 5623 | 296 | 550 | 371 | 1.86 |
| UE | 64.6 | 5.2 | 6650 | 0.16 | 717 | 457 | 1028 | 1036 | 2.25 |

Legend for Tables 4A and 4B:
Column 1: number of examples 1 to 32; or of comparative examples C1 to C7; UE stands for use example,
Column 2: solids content SC of the dispersion in % by weight, determined experimentally according to section 1.1
Column 3: pH of the dispersion,
Column 4: viscosity Bf20 in mPas according to section 1.2,
Column 5: coagulate content in % by weight, based on total monomer, according to section 1.4,
Column 6: screen residue in ppm, based on the total weight of the dispersion, according to section 1.4,
Columns 7, 8, 9: weight-average particle size, Dw, number-average particle size Dn, and a median of the volume distribution of the particle diameter D3,50, according to section 1.3
Column 10: polydispersity PD.

10. Discussion of Results

Examples 1 to 14 demonstrate how and in what way, through choice of the concentration (C) of polyvinyl alcohol in the water in the initial charge and optionally choice of the initial addition rate VZ of polyvinyl alcohol per minute and liter of water in the initial charge, especially for concentrations (C)=0 g/l, it is possible to set particle sizes Dw within the range between 120 and 1500 nm. FIG. 1 illustrates this surprising finding: FIG. 1 is a diagram of the volume frequency distributions of the particle size obtained by examples 1, 3, 6, 8, 10, 12, 13 and 14; the maxima of the volume frequency distributions shown, from left to right, correspond to the ascending example numbers.

For examples 1 to 14, different oxidizing agents were used; cf., in table 2A: the influence on the particle sizes achievable that they have, which is understandable to the person skilled in the art, can be utilized as an additional variable, but the effect achievable is small compared to the influence of the concentration of protective colloid and the addition rate of the protective colloid.

The solids contents SC used in each case can be found in table 4A. Table 4A also lists the polydispersity PD achieved in each case, which, for examples 1 to 14, assumes surprisingly low PD values between 1.05 and 1.03.

Examples 15 to 19 are based on example 4: examples 15 to 19 demonstrate that a variation in the feed rate of vinyl ester (examples 15 and 16), in the feed rate of initiator (example 17) or in the amount of aqueous initial charge of the concentration (C), within the preferred limits, exerts minor influences at most on the weight-average particle size Dw, and so the crucial parameters for regulation of the particle sizes are the concentration (C) and, in a supporting role, initial addition rate VZ.

Example 20 is based on example 6 and demonstrates that a reduction in the proportion of polyvinyl alcohol based on total monomer from 10.1% by weight to 5.4% by weight and an increase in the polymerization temperature from 50° C. to 70° C. has a minor influence at most on the weight-average particle sizes Dw, and this is ascribed first and foremost to the change in the reducing agent. In this regard, example 21, which is based on example 20, shows the unsurprising finding that different redox combinations can lead to changes, albeit comparatively minor changes, in the particle sizes Dw.

Examples 22 to 25 demonstrate processes according to the invention with use of S-PVOH of different molar mass and different hydrolysis level, and for X-PVOH. This results in the finding, which is unsurprising to the person skilled in the art, that use of fully hydrolyzed polyvinyl alcohols in examples 24 and 25 leads to a reduction in the number of latex particles that form in a particle formation phase, which entails higher mean particle sizes Dw in the end product. This does not affect the possibility of regulating the particle sizes Dw via the concentration (C) and the initial addition rate VZ.

Examples 26 and 27 demonstrate processes according to the invention for production of vinyl acetate-ethylene and vinyl acetate-vinyl laurate-ethylene copolymers.

Examples 28 and 29 demonstrate processes according to the invention for production of vinyl acetate-vinyl laurate copolymers or for production of vinyl acetate-acrylate copolymers.

Examples 30 to 31 demonstrate processes according to the invention for production of vinyl acetate-vinyl versatate copolymers, which can also be made crosslinkable, as demonstrated by examples 31 and 32.

Figure 2:
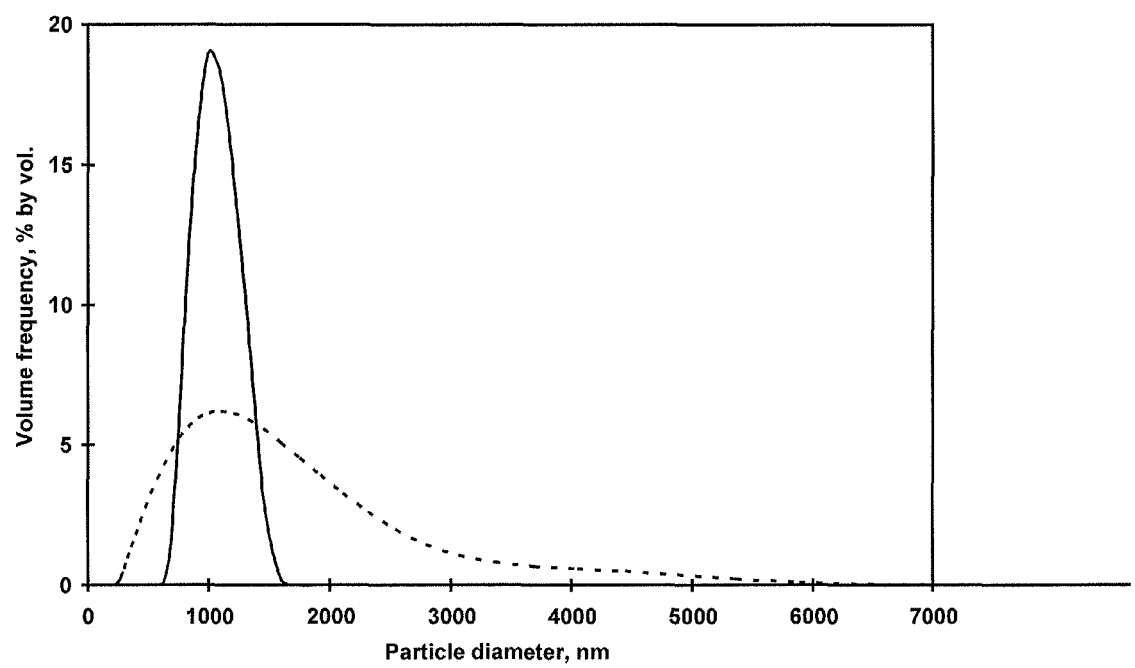
FIG. 2 shows volume frequency distributions of particle sizes obtained according to an example of the invention and a comparative example.

Comparative example C1 corresponds essentially to example 24, except that, for C1, the total amount of polyvinyl alcohol was added to the initial charge and no polyvinyl alcohol was metered in, which corresponds to the customary procedure in the prior art and consequently leads to a high value for the polydispersity PD>1.6. By way of illustration, FIG. 2 shows the volume frequency distributions for example 24 and comparative example C1: example 24 has a "narrow distribution" with a maximum at 19% by volume and is characterized by a polydispersity PD=1.15, whereas comparative example C1 (shown as a dotted curve) exhibits a very "broad distribution" with a maximum at 6.2% by volume and is characterized by a polydispersity PD=2.38.

Comparative examples C2 to C5 demonstrate the resultant high values for the polydispersity PD>1.6 in the case of use of various polyvinyl alcohols that were each introduced into the initial charge in their entirety, i.e. without metered addition of polyvinyl alcohol. Comparative example C3 corresponds essentially to example 31, with the significant difference mentioned. While a polydispersity PD=1.36 was obtained for example 31 as per the process according to the invention, a very "broad distribution" with a polydispersity PD=10.1 is obtained for comparative example. The cause of these major differences is that particle aggregation processes over the course of the polymerization, after conclusion of the particle formation phase, can be minimized, if not entirely suppressed, in processes according to the invention, whereas dispersions of the same composition produced according the prior art lead to very broad frequency distributions because of unsuppressed particle aggregations.

Figure 3:
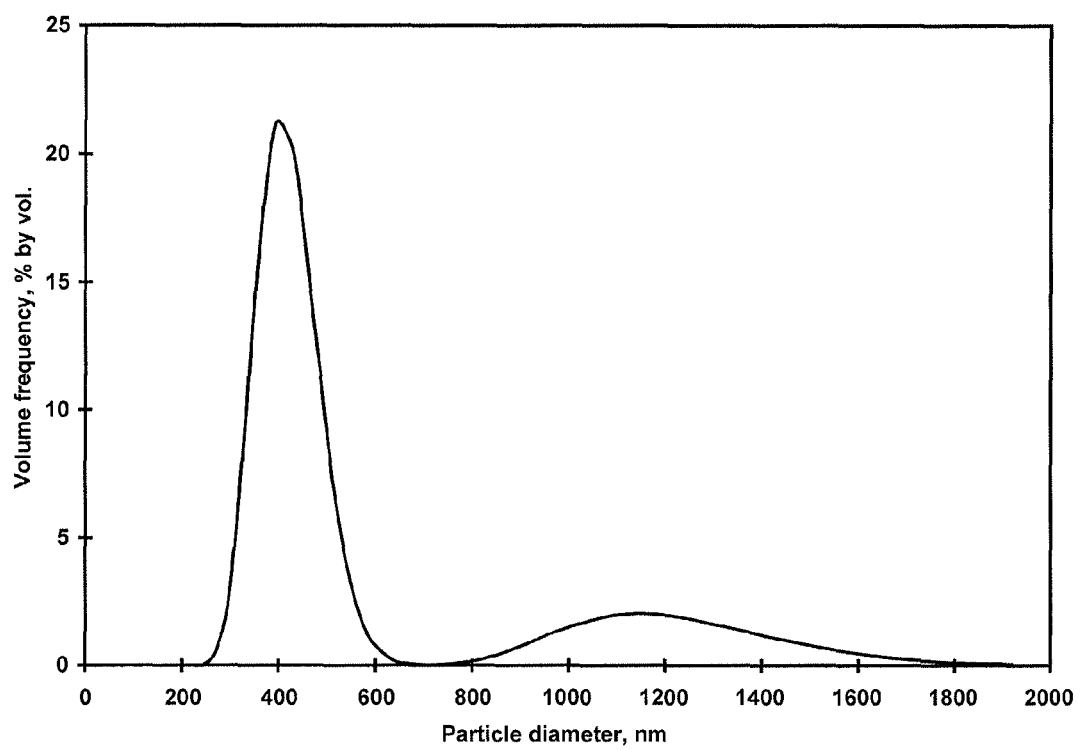
FIG. 3 shows the volume frequency distribution of particle sizes obtained according to a comparative example.

Comparative example C6 demonstrates that, when vinyl ester is used in the initial charge, a volume frequency distribution with a second coarse particle fraction arises. FIG. 3 illustrates this state of affairs. FIG. 3 is a diagram of the volume frequency distribution for comparative example C6, for which addition of vinyl ester to the initial charge leads to formation of coarse particle fractions having a second maximum to the right-hand side; the proportion of particles in this maximum is 9.8% by volume, which is unacceptable.

For comparative example C7, no vinyl ester was used, but rather a mixture of styrene and butyl acrylate. This comparative example demonstrates that it is also possible—with parameters corresponding to the processes according to the invention—to produce finely divided polymers for monomer mixtures other than the vinyl esters used in processes according to the invention, but the required low polydispersity PD<1.6 is not fulfilled and the particle size (as becomes clear from further experiments not detailed here) cannot be set in a selectable manner within the range between 120 nm and 1500 nm. In addition, it was found that C7 did not achieve complete conversion of the monomers to polymer.

The use example UE demonstrates, by way of example, the production of polymer dispersions having a solids content SC>60% by weight, based on the total weight of the dispersion, the polymerization being effected here specifically although not obligatorily by the processes according the invention in a first step, certain proportions of the dispersion produced to example 2 being added in an intermediate step in the course of the polymerization, and the polymerization then being continued.

As is well known, the viscosity Bf20 of polymer dispersions rises exponentially with increasing solids content SC. The use example demonstrates the advantage of using dispersions produced in accordance with the invention in free-radical emulsion polymerization processes for production of high-solids dispersions having SC>60% by weight, which allows production of such dispersions without the viscosity assuming extremely high values, for example Bf20>30 000 mPas.

The invention claimed is:

1. A process for producing protective colloid-stabilized aqueous dispersions of vinyl ester polymers having weight-average particle diameters Dw of 120 nm to 1500 nm and a polydispersity PD of <1.6
    by means of free-radically initiated emulsion polymerizations of one or more vinyl esters and optionally one or more further ethylenically unsaturated monomers in an aqueous medium in the presence of one or more protective colloids, characterized in that an aqueous mixture comprising 0 to 90 grams of one or more protective colloids per liter of water in the initial charge (concentration (C)) is initially charged and,
    commencing with or after the start of metered addition of one or more initiators, one or more protective colloids and the total amount of vinyl esters used in the process for producing the protective colloid-stabilized aqueous dispersions are metered in,
    the emulsion polymerizations being performed in the absence of vinyl halides, and
    no emulsifiers being used during the emulsion polymerizations.

2. The process for producing protective colloid-stabilized aqueous dispersions of vinyl ester polymers as claimed in claim 1, characterized in that an aqueous mixture comprising 0.1 to 90 grams of one or more protective colloids per liter of water in the initial charge (concentration (C)) is initially charged.

3. The process for producing protective colloid-stabilized aqueous dispersions of vinyl ester polymers as claimed in claim 1, characterized in that the following concentrations (C) are used for the production of dispersions having the following weight-average particle sizes Dw:
    (a) for weight-average particle sizes Dw of 120 to 200 nm the concentration (C) is between 55 and 90 grams of protective colloid per liter of water in the initial charge;
    (b) for weight-average particle sizes Dw of greater than 200 to less than 500 nm the concentration (C) is between 55 and 15 grams of protective colloid per liter of water in the initial charge; and
    (c) for weight-average particle sizes Dw of 500 nm the concentration (C) is between 15 and 0.0 grams of protective colloid per liter of water in the initial charge.

4. The process for producing protective colloid-stabilized aqueous dispersions of vinyl ester polymers as claimed in claim 1, characterized in that the metered addition of one or more protective colloids is effected at an addition rate of 0.1 to 5 grams of protective colloid per liter of water in the initial charge and minute (initial addition rate (VZ)).

5. The process for producing protective colloid-stabilized aqueous dispersions of vinyl ester polymers as claimed in claim 4, characterized in that the following initial addition rates (VZ) are used for the production of dispersions having the following weight-average particle sizes Dw:
    (α) for weight-average particle sizes Dw of 120 to 200 nm the initial addition rate (VZ) is 0.1 to 2 grams of protective colloid per liter of water in the initial charge and minute;
    (β) for weight-average particle sizes Dw of greater than 200 to less than 500 nm the initial addition rate (VZ) is 0.2 to 3 grams of protective colloid per liter of water in the initial charge and minute; and (γ) for weight-average particle sizes Dw of 500 nm the initial addition rate (VZ) is 0.3 to 5 grams of protective colloid per liter of water in the initial charge and minute.

6. The process for producing protective colloid-stabilized aqueous dispersions of vinyl ester polymers as claimed in claim 4, characterized in that concentrations (C) are between 0.0 and 8 grams of protective colloid per liter of water in the initial charge and the initial addition rate (VZ) is between 0.3 and 3.0 grams of protective colloid per liter of water in the initial charge and minute for the production of dispersions having weight-average particle sizes Dw of 700 nm to 1500 nm.

7. The process for producing protective colloid-stabilized aqueous dispersions of vinyl ester polymers as claimed in claim 1, characterized in that the metered addition of one or more protective colloids is commenced when 0.0% to 10% by weight of one or more vinyl esters, based on the total weight of the total amount of vinyl esters used, has been metered in.

* * * * *

UNITED STATES PATENT AND TRADEMARK OFFICE
CERTIFICATE OF CORRECTION

PATENT NO.      : 9,650,507 B2
APPLICATION NO. : 14/390120
DATED           : May 16, 2017
INVENTOR(S)     : Helmut Zecha et al.

It is certified that error appears in the above-identified patent and that said Letters Patent is hereby corrected as shown below:

In the Claims

At Column 40, Line 46 of the Letters Patent, in Claim 3, "(c) for weight-average particle sizes Dw of 500 nm" should read --(c) for weight-average particle sizes Dw of $\geq$ 500 nm--.

At Column 41, Line 1 of the Letters Patent, in Claim 5, "($\gamma$) for weight-average particle sizes Dw of 500 nm" should read --($\gamma$) for weight-average particle sizes Dw of $\geq$ 500 nm--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*